(12) United States Patent
Phibbs et al.

(10) Patent No.: US 8,595,217 B2
(45) Date of Patent: Nov. 26, 2013

(54) TECHNIQUES FOR USING DATABASE METRIC RESULTS

(75) Inventors: Paul H. Phibbs, Escondido, CA (US); Marianne Ruegsegger, Escondido, CA (US); Linette Draper, Escondido, CA (US)

(73) Assignee: Teradata US, Inc., Dayton, OH (US)

( * ) Notice: Subject to any disclaimer, the term of this patent is extended or adjusted under 35 U.S.C. 154(b) by 770 days.

(21) Appl. No.: 12/351,486

(22) Filed: Jan. 9, 2009

(65) Prior Publication Data

US 2010/0185602 A1 Jul. 22, 2010

(51) Int. Cl.
G06F 7/14 (2006.01)
G06F 17/30 (2006.01)

(52) U.S. Cl.
CPC .... G06F 17/30439 (2013.01); G06F 17/30451 (2013.01); G06F 17/30442 (2013.01)
USPC ............ 707/718; 707/713; 707/719; 707/769

(58) Field of Classification Search
CPC .................... G06F 17/30439; G06F 17/30451; G06F 17/30442
USPC .......... 707/2, 3, 999.002, 999.003, 713, 721, 707/771, 4, 999.004, 769, 715
See application file for complete search history.

(56) References Cited

U.S. PATENT DOCUMENTS

| 6,785,668 | B1 * | 8/2004 | Polo et al. ..................... 707/771 |
| 7,177,858 | B2 | 2/2007 | Belowsov |
| 2003/0140036 | A1 | 7/2003 | Belowsov |
| 2003/0187831 | A1 * | 10/2003 | Bestgen et al. .................. 707/3 |
| 2004/0059701 | A1 | 3/2004 | Federov |
| 2005/0010933 | A1 | 1/2005 | Vaught |
| 2006/0294079 | A1 * | 12/2006 | Dettinger et al. ................. 707/3 |
| 2009/0319477 | A1 * | 12/2009 | Idicula et al. ..................... 707/2 |

* cited by examiner

*Primary Examiner* — Bruce Moser
(74) *Attorney, Agent, or Firm* — Schwegman, Lundberg & Woessner, P.A.

(57) ABSTRACT

Techniques for using database metric results are provided. Structure Query Language (SQL) statements are parsed for multiple metric calculations. Each metric calculation is dynamically processed against a database to obtain combined results. The combined results are fed to remaining portions of the SQL statements as a source for or a driver to the remaining portions of the SQL statements.

19 Claims, 3 Drawing Sheets

TECHNIQUES FOR USING DATABASE METRIC RESULTS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example screen shots for a report tool as described below and in any drawings hereto: Copyright©2008, Teradata, Inc. All Rights Reserved.

BACKGROUND

Enterprises now track all aspects of their business electronically. Every transaction with a customer, information about the customer, inventory, capital, expenses, etc. are captured, indexed, and stored in an enterprise's database. Very quickly the enterprise's database becomes enormous in size having a plethora of information. Accordingly, enterprises are increasingly relying on their information for driving and managing all aspects of their business operations.

In fact, enterprises often develop reports and real-time statistics from their databases. Typically, the interface for achieving these reports and statistics is a Structured Query Language (SQL). Often, analysts develop complex SQL statements that execute against the database for purposes of gaining different insight into the details of the business.

These SQL statements can include a variety of nested and complex rules and may rely on results from prior SQL queries. Unfortunately, users are generally not permitted to use metric results as a source or driver to the complex rules embedded in SQL statements.

So, users may have to iterate may have to develop many different sets of SQL statements to account for results that may be needed. This is time consuming and inefficient.

As a result, improved techniques for using database metric results are needed.

SUMMARY

In various embodiments, techniques for using database metric results are provided. More particularly, a method for using database metric results is provided. Specifically, Structured Query Language (SQL) statements are received and a first metric calculation and a second metric calculation are identified in the SQL statements. The first metric calculation and the second metric calculation are a source for a target rule within the SQL statements. Next, the first metric calculation and the second metric calculation are processed against a database and results are used as the source that is fed to the target rule within the SQL statements; and the target rule is processed with the results.

DETAILED DESCRIPTION

Figure 1:
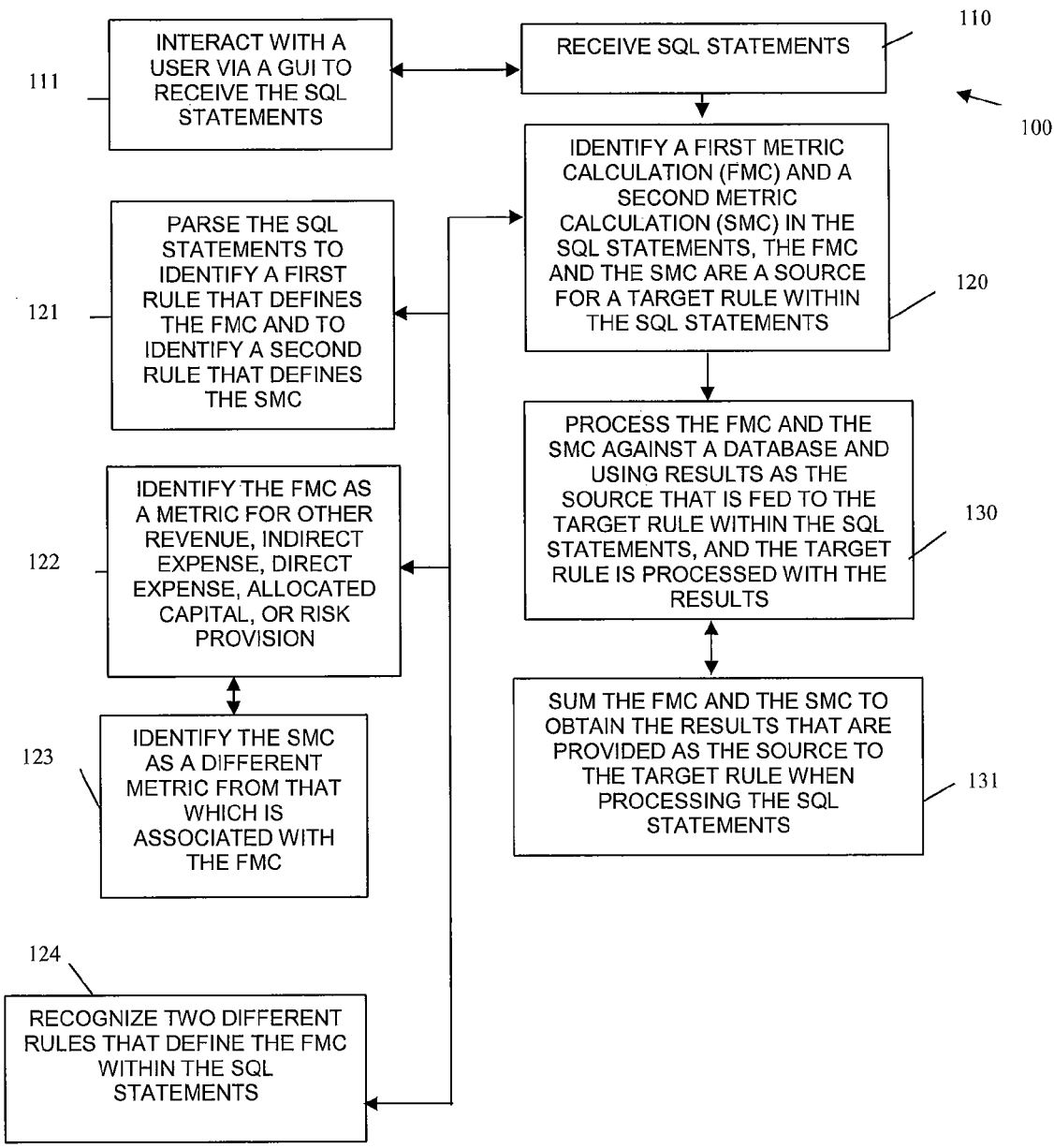
FIG. 1 is a diagram of a method for using database metric results, according to an example embodiment.

FIG. 1 is a diagram of a method 100 for using database metric results, according to an example embodiment. The method 100 (herein after referred to as "database metric service") is implemented in machine-accessible or computer-readable storage medium as instructions that are executed by one or more machines (processors, computers, etc.). Moreover, the database metric service is accessible over a network. The network may be wired, wireless, or a combination of wired and wireless.

A "database" as used herein refers to a relational database. In an embodiment, the database uses a Structured Query Language (SQL) interface.

A "statement" is a set of SQL operations that are capable of being processed by a database's Application Programming Interface (API) to perform database operations, such as queries. The results associated with processing the statement(s) can be reports, statistics, other database tables, etc.

A "rule" is a conditional comparison identified in a statement, such as If X then Y or When X Do Y, and the like. Rules can have labels and can be accessed by reference or via a name from statements and some rules can incorporate other rules, such as When (Rule X) Do (Rule Y), etc. So, rules can be accessed by reference, nested, simple, complex, etc., and the rules are embedded in statements.

It is within this initial context that the processing associated with the rule ordering service is now discussed in detail.

At 110, the database metric service receives Structured Query Language (SQL) statements. The database metric service can acquire or receive the SQL statements in a variety of manners.

For example, at 111, the database metric service interacts with a user via a Graphical User Interface (GUI) to receive the SQL statements. In other cases, a user submits the SQL statements via an application or via a command line operation that the database metric service intercepts and processes in the manners discussed herein and below.

At 120, the database metric service identifies a first metric calculation and a second metric calculation in the SQL statements. Both the first metric calculation and the second metric calculation are used within the SQL statements as a source for a target rule that is also present in the SQL statements.

For example, a user, via the SQL statements may define multiple rules within a Direct Expense (DE) metric that targets Accounts from a database. A metric result is defined as the sum of those two rules at the account level. So, the metric result for Account 10001 is the sum of the result of rule 1 for account 1001 and the result of rule 2 for account 1001.

Previously users were only capable of having a single previous rule within a metric as a source. Rules might have been capable of being chained but were limited to stay within the metric. Just a single rule was capable of being specified. Metric results were only used as a drive in the case of special Indirect Expense (IE) rules.

The database metric service allows users to create complex rule chains. So, instead of a single previous rule, now multiple previous rules from multiple metrics may be used as either the source or the driver. For example, the user can specify as a source the sum of the results of an Other Revenue (OR) rule, the results of an Allocated Capital (AC) rule, and the results of an AB rule. In a same rule, a driver can be specified as the sum or the results of a Direct Expense (DE) rule and the results of an OR rule.

In addition, one or more metric results can be used as either the source of the driver to other portions of the SQL statements. This allows the user to specify, for example, the results for NIR and OR as a source for a given rule. The results are summed at an object/modifier level and uses as the source. In another example, OR and DE metric results are used as a driver.

So, a source can be the sum of a set of metric results, while the driver can be a set of previous rules, and likewise a source can be a set of previous rules while a driver can be a sum of a set of metric results.

When multiple metric results are used to create a source or driver, the results are summed. Results are stored with a positive sign for the expected result. For example, DE, IE, and Risk Provision (RP) are stored with a positive number, albeit these numbers reflect expense items. When multiple previous metrics are summed, an appropriate sign is applied to the incoming value so that the summing metrics for income and expense metrics can be done properly. As an example, if a rule used to combine metric results of OR, AC, and DE as a driver, the calculation is:

Driver Amount=OR+AC−DE (for each object number/modifier).

So, while the DE result may be stored as a positive number, the result is multiplied by a sign adjustment value.

Thus, as described herein above and below, the database metric service permits complex rule chaining by expanding current source and driver options and allowing users the following additional capability when selecting source and driver amounts:

one or more metric results as the source; and
one or more metric results as the driver.

Continuing now with the discussion of the FIG. 1.

According to an embodiment, at 121, the database metric service parses the SQL statements to identify a first rule that defines the first metric calculation and to identify a second rule that defines the second metric calculation.

In another case and as discussed above, at 122, the database metric service identifies the first metric calculation as a metric for IE, DE, AC, or RP.

Continuing with the embodiment at 122 and at 123, the database metric service also identifies the second metric calculation as a different metric from that which is associated with the first metric calculation. That is, the first and second metric calculations are different from one another.

In still another situation, at 124, the database metric service recognizes two different rules that define the first metric calculation within the SQL statements. That is, when evaluating the first metric calculation multiple or even chained and complex rules are evaluated for the first metric calculation. This can also be the case with the second metric calculation.

At 130, the database metric service processes the first metric calculation and the second metric calculation against a database. Results associated with processing the first and second metric calculations are then used as a source to another target rule identified within the SQL statements. The target rule is also processed with the SQL statements.

According to an embodiment, at 131, the database metric service sums the first metric calculation and the second metric calculation to obtain the results. The results are provided as the source to the target rule when processing the remaining portions of the SQL statements.

So, multiple metrics are capable of being used within SQL statements and the results associated therewith can be used as the source to other portions of the same SQL statements. Previously, this was not capable.

Figure 2:
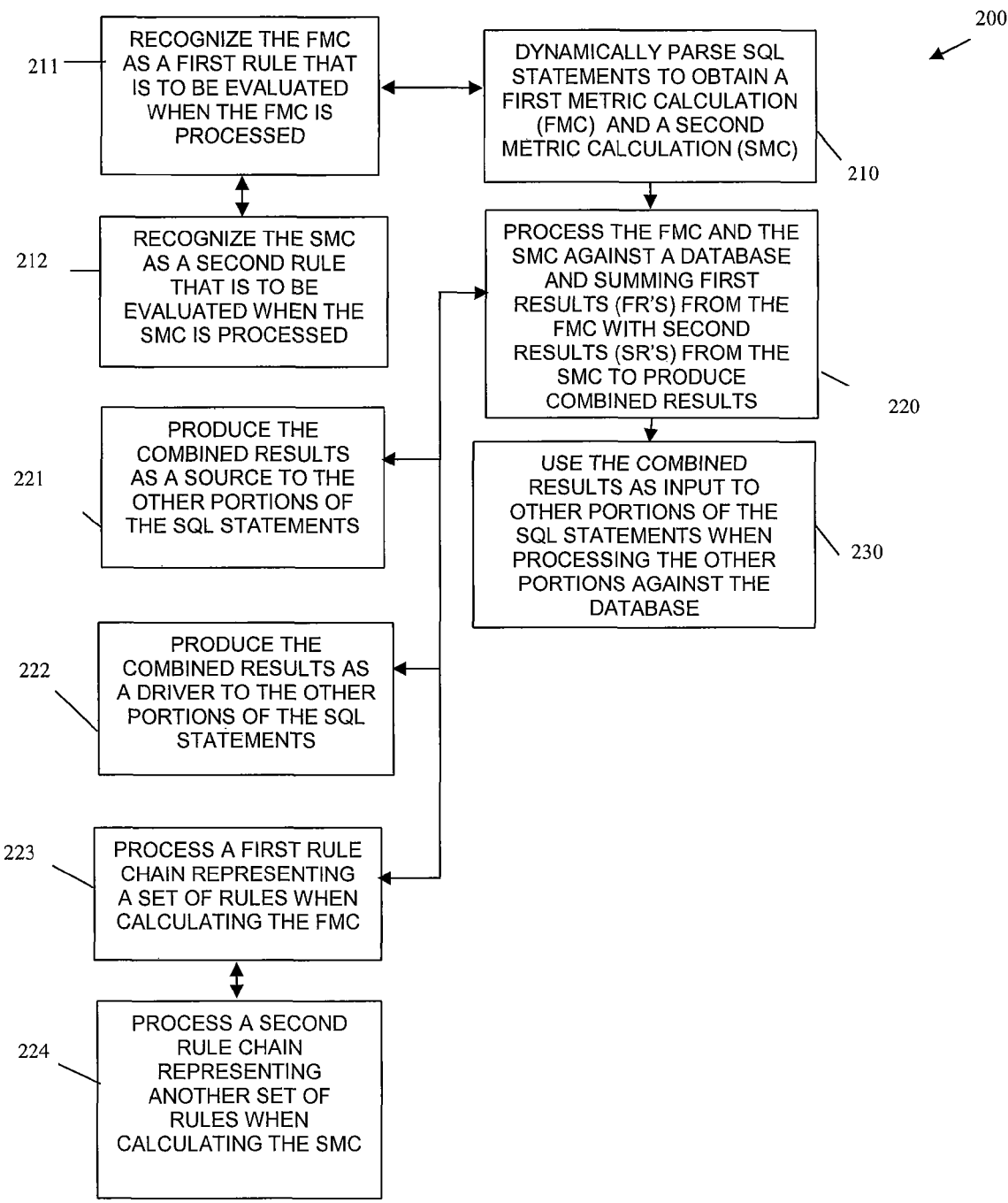
FIG. 2 is a diagram of another method for using database metric results, according to an example embodiment.

FIG. 2 is a diagram of another method 200 for using database metric results, according to an example embodiment. The method 200 (hereinafter referred to as "database results service") is implemented in a machine-accessible and computer-readable storage medium as instructions that when executed by a machine (processor, computer, etc.) performs the processing depicted in FIG. 2. Moreover, database results service is operational over a network, which may be wired, wireless, or a combination of wired and wireless.

The database results service provides another and in some cases enhanced perspective to the database metric service represented by the method 100 of the FIG. 1, discussed in detail above.

At 210, the database results service dynamically parses SQL statements to obtain a first metric calculation and a second metric calculation.

According to an embodiment, at 211, the database results service recognizes the first metric calculation as a first rule that is to be evaluated when the first metric calculation is processed. The first metric calculation can also be multiple first rules or an entire complex chain of first rules.

Continuing with the embodiment at 211 and at 212, the database results service recognizes the second metric calculation as a second rule that is to be evaluated when the second metric calculation is processed. Again, the second rule can include multiple second rules or an entire chain of complex second rules.

At 220, the database results service processes the first metric calculation and the second metric calculation against a database. First results acquired from processing the first metric calculation are then summed with second results acquired from processing the second metric calculation. The sum provides combined results.

In an embodiment, at 221, the database results service produces the combined results as a source to other portions of the SQL statements.

In another case, at 222, the database results service produces the combined results as a driver to other portions of the SQL statements.

According to an embodiment, at 223, the database results service processes a first rule chain, which represents a set of rules, when calculating the first metric calculation.

Continuing with the embodiment at 223 and at 224, the database results service processes a second rule chain, which represents another set of rules, when calculating the second metric calculation.

At 230, the database results service uses the combined results as input to other portions of the SQL statements when processing the other portions against the database.

Figure 3:
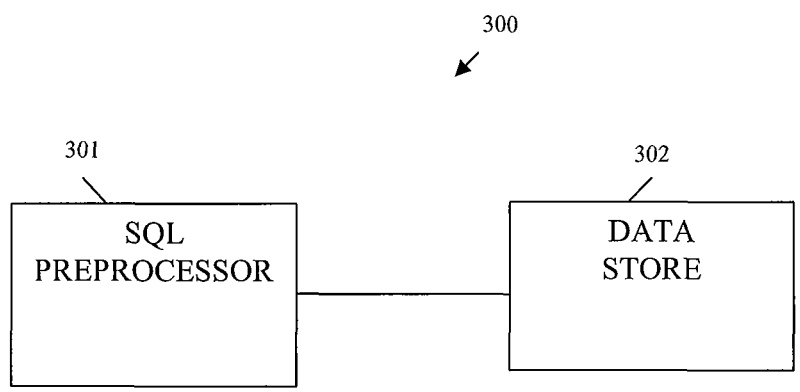
FIG. 3 is a diagram of a database metric results system, according to an example embodiment.

FIG. 3 is a diagram of a database metric results system 300, according to an example embodiment. The database metric results system 300 is implemented in a machine-accessible and computer-readable storage medium as instructions that when executed by a machine(s) (processor(s), computer(s), etc.) performs a variety of processing, such as the processing discussed in detail above with reference to the methods 100 and 200 of the FIGS. 1 and 2.

The database metric results system 300 includes a SQL preprocessor 301 and a database 302. Each of these and their interactions with one another will now be discussed in detail.

The SQL preprocessor 301 is implemented in a computer-readable storage medium and executed by a processor of a network. Example aspects of the SQL preprocessor 301 were presented in detail above with reference to the methods 100 and 200 of the FIGS. 1 and 2, respectively. Moreover, an example implementation of the SQL preprocessor 301 is presented below after the discussion of the FIG. 3.

The SQL preprocessor 301 iterates SQL statements to automatically and dynamically identify and process multiple metric calculations against the database 302. This produces combined results that feed other portions of the SQL statements when those other portions of the SQL statements are processed.

According to an embodiment, the SQL preprocessor 301 iterates the SQL statements to process multiple sets of rules for each of the metric calculations. So, each metric calculation can include multiple sets of chained and complex rules that are evaluated when resolving each metric calculation.

In another case, the SQL preprocessor 301 feeds the combined results as a source input to a rule that represents the other portions of the SQL statements.

In yet another situation, the SQL preprocessor 301 feeds the combined results as a driver to the remaining portions of the SQL statements.

In an embodiment, the SQL preprocessor 301 interacts with a user via a graphical user interface (GUI) to interactively acquire the SQL statements.

The database 302 is implemented in a computer-readable storage medium and is accessible to the SQL preprocessor 301. Example aspects of the database 302 were presented above with reference to the methods 100 and 200 of the FIGS. 1 and 2, respectively.

According to an embodiment, the database 302 is a data warehouse that includes a collection of databases logically organized and accessible as a single unit.

It is understood that other embodiments may be used to achieve the teachings presented herein and above and that the example source code presented below is but one implementation capable with the teachings presented. The source code that follows is presented as one example implementation of the teachings presented herein.

```
REPLACE PROCEDURE sp0435_1(POCode CHAR(4),
            PCCode CHAR(2),
            SrcDrv char(3),
            RuleScenLvl Char(4))

/***********************************************************************
*   This procedure is used to generate SQL which will Produce W3168_Metric_Sum_Src  Prev Metrics Result Source
        Produce W3168_Metric_Sum_Drv  Prev Metrics Result driver METRICS
*
***********************************************************************/

SP435: BEGIN

DECLARE vNextSQLKey  INTEGER;
DECLARE vMinRange    INTEGER;
DECLARE vMaxRange    INTEGER;
DECLARE vPCType      INTEGER;
DECLARE vRowCount    INTEGER;
DECLARE vDynSQLdb    VARCHAR(30);
DECLARE vViewdb      VARCHAR(30);
DECLARE vDTBase      VARCHAR(30);
DECLARE vDTBaseMod   VARCHAR(30);
DECLARE vDTAssoc     VARCHAR(30);
```

```
      '    null,'   ||
      '    null,'   ||
      '    null,'   ||
      '    null;');

End if;

End if;

END SP435;
```

*Copyright © 2008 TERADATA Corporation, Dayton, Ohio*
*All Rights Reserved*

```
DECLARE vDTAssocMod  VARCHAR(30);
DECLARE vPrefix    VARCHAR(5);
DECLARE vSourceTable VARCHAR(61);
DECLARE SumTbl_wDB VARCHAR(61);
DECLARE SumTbl_woDB VARCHAR(30);
DECLARE SumTbl_Tots VARCHAR(61);
DECLARE SumTbl_tempwDB VARCHAR(61);
DECLARE SumTbl_tempwoDB VARCHAR(30);
DECLARE vPrevRuleTable VARCHAR(61);
DECLARE vSelectorDrvTbl VARCHAR(61);
DECLARE vSelectorTrgTbl VARCHAR(61);
DECLARE vTargetTable VARCHAR(61);
DECLARE PrevRsltKeyA VARCHAR(1000);
DECLARE PrevRsltKeyB VARCHAR(1000);
DECLARE SelTrgKeyA VARCHAR(1000);
DECLARE SelTrgKeyB VARCHAR(1000);
DECLARE PrevRsltAmtCol VARCHAR(1000);
DECLARE SelRelate    VARCHAR(30);
DECLARE JoinRelate   VARCHAR(30);
DECLARE SrcRelate    VARCHAR(30);
DECLARE SrcRelated   VARCHAR(30);
DECLARE Src_Relates Integer;
DECLARE Src_Related Integer;
DECLARE Trg_Obj_Type_Cd Integer;
DECLARE Drv_Obj_Type_Cd Integer;
DECLARE Src_Obj_Type_Cd Integer;
DECLARE vTrgTabl    VARCHAR(30);
DECLARE vSQLStats   VARCHAR(200);
DECLARE vSQLStmt    VARCHAR(10000);
DECLARE Asst_Rslt_Obj_typ VARCHAR(10000);
DECLARE Working_Rule_Id Integer;
DECLARE Curs_Rule_Id Integer;
DECLARE Src_Mult_Rate Decimal(15,12);
DECLARE PrevRslt_Rule_Id Integer;
DECLARE Curr_Categ_Cd Integer;
DECLARE Prev_Categ_Cd Integer;
DECLARE Working_Src_Type_Cd Integer;
DECLARE Crit_or_all_cd Smallint;
DECLARE Curr_Rel_Id Smallint;
DECLARE Src_Rel_Id Smallint;
DECLARE SignVal    Decimal(4,2);
DECLARE Amt_Col    VARCHAR(100);
DECLARE vBC2Source  VARCHAR(61);
DECLARE Where_Obj_Typ VARCHAR(61);
DECLARE Prev_Metric_Txt VARCHAR(3);
DECLARE ABS_Flag CHAR(1);
```

```
DECLARE Prev_Metric_Cd Smallint;
DECLARE Trg_Amort_Ind smallint;
DECLARE After_exec_stmt_status_cd INTEGER;
DECLARE After_exec_error_code    INTEGER;
DECLARE Rule_List   VARCHAR(5000);

DECLARE CONTINUE HANDLER FOR SQLException
BEGIN
   SET After_exec_stmt_status_cd = 5;
   SET After_exec_error_code = SQLCODE;
   INSERT $VIEWDB.V3340_calc_engine_sql
       ( Calc_Engine_SQL_Seq_Num,
         Metric_Cd,
         Calc_Engine_Function_Cd,
         Calc_Engine_Intrnl_Process_Num,
         SQL_Stmt_Function_Type_Cd,
         SQL_Stmt_Txt,
         SQL_Stmt_Start_Dttm,
         SQL_Stmt_End_Dttm,
         SQL_Stmt_Elapsed_Tm_DD,
         SQL_Stmt_Status_Cd,
         SQL_Stmt_Status_Msg_Cd,
         DBMS_Error_Cd,
         DBMS_Activity_Cnt,
         DBMS_Session_Id )
       select
          Max(Calc_Engine_SQL_Seq_Num) + 1 ,
          0,  2,  10,   9999 ,
          'ERROR IN PROCEDURE SP0435_1:  ERROR Code --->  ',
          current_timestamp ,  null ,   null ,
          5,
          :after_exec_error_code , null , null , null
     from $VIEWDB.V3340_calc_engine_sql ,
        $VIEWDB.v3339_calc_engine_function_seq
     where calc_engine_sql_seq_num >= Min_calc_engine_sql_seq_num
       and  calc_engine_sql_seq_num < Max_calc_engine_sql_seq_num
       and v3339_calc_engine_function_seq.calc_engine_function_cd = 0;
END;

Select
 calc_Engine_parameter_txt
into
 :Rule_List
from
 $VIEWDB.V3343_Calc_Engine_Parameter
```

```
Where
  calc_Engine_parameter_id = 35;

If Rule_List = 'trace'
Then
    Set Rule_List = ' ';

FOR IORow as IOCursor CURSOR FOR
    SELECT  Profit_Rule_Id
    FROM $VIEWDB.V3347_CALC_ENGINE_WIP_SUBSET
    ORDER BY 1
    DO
      Set Rule_List = Rule_List||IORow.Profit_Rule_Id||' ';
    End For;

Set VSqlStmt = 'Entering Sp0435: '||RuleScenLvl||', Metric '||PCCode||
    ', ObjLvl '||POCode||', SrcDrv '||SrcDrv
    ||' Rule List: '||Rule_List ;

INSERT $VIEWDB.V3340_calc_engine_sql
    ( Calc_Engine_SQL_Seq_Num,
    Metric_Cd,
    Calc_Engine_Function_Cd,
    Calc_Engine_Intrnl_Process_Num,
    SQL_Stmt_Function_Type_Cd,
    SQL_Stmt_Txt,
    SQL_Stmt_Start_Dttm,
    SQL_Stmt_End_Dttm,
    SQL_Stmt_Elapsed_Tm_DD,
    SQL_Stmt_Status_Cd,
    SQL_Stmt_Status_Msg_Cd,
    DBMS_Error_Cd,
    DBMS_Activity_Cnt,
    DBMS_Session_Id )
    select
      Max(Calc_Engine_SQL_Seq_Num) + 1 ,
      0,  2,  10,  9999 ,
      :VSqlStmt,
      current_timestamp , null,  null ,
      5,
      0 , null,  null,  null
    from $VIEWDB.V3340_calc_engine_sql
    where calc_engine_sql_seq_num >= 20000000;
End if;
```

```
/***********************************************************************

Get the next sequence number for this profitability component.

***********************************************************************/

CASE PCCode
    WHEN 'AB' THEN SET vPCType  = 11;
    WHEN 'AC' THEN SET vPCType  = 10;
    WHEN 'DE' THEN SET vPCType  = 3;
    WHEN 'OR' THEN SET vPCType  = 2;
    WHEN 'RP' THEN SET vPCType  = 5;
    WHEN 'IE' THEN SET vPCType  = 4;
END CASE;

SELECT Min_Calc_Engine_SQL_Seq_Num,
     Max_Calc_Engine_SQL_Seq_Num
INTO   :vMinRange,
     :vMaxRange
FROM   $VIEWDB.V3339_CALC_ENGINE_FUNCTION_SEQ
WHERE  Calc_Engine_Function_Cd = 2 and
     Metric_Cd = :vPCType;

SELECT ZEROIFNULL(MAX(Calc_Engine_SQL_Seq_Num))
   INTO   :vNextSQLKey
   FROM   $VIEWDB.V3340_CALC_ENGINE_SQL
     WHERE Calc_Engine_SQL_Seq_Num BETWEEN :vMinRange AND
:vMaxRange;

IF vNextSQLKey = 1
   THEN SET vNextSQLKey = vMinRange;
   END IF;

/***********************************************************************

Get T3022 Parameter Info:

- View db and Dynamic SQL db names

***********************************************************************/

SELECT M0010.Physical_Database_Name
   INTO   :vViewdb
```

```
    FROM   $VIEWDB.V0010_TVA_DATABASE M0010
    WHERE  M0010.Logical_Database_Name = 'view';

SELECT M0010.Physical_Database_Name
    INTO   :vDynSQLdb
    FROM   $VIEWDB.V0010_TVA_DATABASE M0010
    WHERE  M0010.Logical_Database_Name = 'dynamicSQL';

SELECT T3022.Parameter_Txt
    INTO   :vDTBase
    FROM   $VIEWDB.V3022_PARAMETER_DATA T3022
    WHERE  T3022.Parameter_Id = 30;

SELECT T3022.Parameter_Txt
    INTO   :vDTBaseMod
    FROM   $VIEWDB.V3022_PARAMETER_DATA T3022
    WHERE  T3022.Parameter_Id = 31;

SELECT T3022.Parameter_Txt
    INTO   :vDTAssoc
    FROM   $VIEWDB.V3022_PARAMETER_DATA T3022
    WHERE  T3022.Parameter_Id = 32;

SELECT T3022.Parameter_Txt
    INTO   :vDTAssocMod
    FROM   $VIEWDB.V3022_PARAMETER_DATA T3022
    WHERE  T3022.Parameter_Id = 33;

SET vViewdb   = TRIM(vViewdb);
    SET vDynSQLdb = TRIM(vDynSQLdb);

/************************************************************************/
/************************************************************************/
/***                      *******************************************/
/***   DRV Previous Metric Sums   *******************************************/
/***                      *******************************************/
/************************************************************************/
/************************************************************************/

/************************************************************************
  Build table references using db names, PCCode, and fixed name
segments.
************************************************************************/
If SrcDrv = 'Drv'
Then
  If POCODE = 'ASST'
```

```
Then
  SET SumTbl_woDB = 'W3168_Metric_Sum_Drv';
  SET SumTbl_wDB = vDynSQLdb || '.W3168_Metric_Sum_Drv';
  SET SumTbl_Tots = vDynSQLdb || '.W3168_Metric_Sum_Drv_Tots';
Else
  SET SumTbl_woDB = 'W3168_BASE_Metric_Sum_Drv';
  SET SumTbl_wDB = vDynSQLdb || '.W3168_BASE_Metric_Sum_Drv';
  SET SumTbl_Tots = vDynSQLdb ||
'.W3168_BASE_Metric_Sum_Drv_Tots';
End if;

/************************************************************************
If the Prev Sum Table already exists, then skip Create Table, else Create
*************************************************************************/
SEL count(*)
INTO :vRowCount
FROM $VIEWDB.V3346_CALC_ENGINE_TABLE_REF
WHERE Calc_Engine_Table_Name = :SumTbl_woDB;

IF vRowCount = 0
THEN
  If POCODE = 'ASST'
  Then
    SET vSQLStmt =
      '"CREATE SET TABLE ' || SumTbl_wDB              ||
      ' (Profit_Scenario_Id INTEGER, '                ||
      ' Profit_Rule_Id INTEGER, '                     ||
      ' Trg_Associate_Obj_Num ' || vDTAssoc || ','    ||
      ' Trg_Associate_Obj_Modifier_Num ' || vDTAssocMod || ',' ||
      ' Relates_Obj_Num ' || vDTAssoc || ','          ||
      ' Relates_Obj_Modifier_Num ' || vDTAssocMod || ',' ||
      ' Drv_Detail_Val VARCHAR(50) , '                ||
      ' Trg_Amortization_Ind_Cd SMALLINT,'            ||
      ' Src_Multiplier_Rate DECIMAL(15,12), '         ||
      ' Trg_Obj_Rule_Amt  DECIMAL(18,4)) '            ||
      ' PRIMARY INDEX ( Profit_Rule_Id, '             ||
      '         Profit_Scenario_Id , '                ||
      '         Trg_Associate_Obj_Num, '              ||
      '         Trg_Associate_Obj_Modifier_Num, '     ||
      '         Relates_Obj_Num, '                    ||
      '         Relates_Obj_Modifier_Num );"';
  Else
    SET vSQLStmt =
      '"CREATE SET TABLE ' || SumTbl_wDB              ||
      ' (Profit_Scenario_Id INTEGER, '                ||
      ' Profit_Rule_Id INTEGER, '                     ||
```

```
   ' Trg_Associate_Obj_Num ' || vDTBase || ','          ||
   ' Trg_Associate_Obj_Modifier_Num ' || vDTBaseMod || ',' ||
   ' Relates_Obj_Num ' || vDTAssoc || ','          ||
   ' Relates_Obj_Modifier_Num ' || vDTAssocMod || ',' ||
   ' Drv_Detail_Val VARCHAR(50) , '   ||
   ' Trg_Amortization_Ind_Cd SMALLINT,'           ||
   ' Src_Multiplier_Rate DECIMAL(15,12), '     ||
   ' Trg_Obj_Rule_Amt  DECIMAL(18,4)) '           ||
   'PRIMARY INDEX ( Profit_Rule_Id, '             ||
   '                Profit_Scenario_Id , '         ||
   '                Trg_Associate_Obj_Num, '        ||
   '                Trg_Associate_Obj_Modifier_Num, ' ||
   '                Relates_Obj_Num, '           ||
   '                Relates_Obj_Modifier_Num );''';
End if;

SET vNextSQLKey = vNextSQLKey + 1;
CALL DBC.SysExecSQL
   ('INS $VIEWDB.V3340_CALC_ENGINE_SQL '  ||
   ' sel ' || :vNextSQLKey || ', ' ||
        :vPCType|| ', '  ||
   '   2, ' ||
   '   435, ' ||
   '   20, ' ||
        :vSQLStmt|| ', '  ||
   '   null,' ||
   '   null,' ||
   '   null,' ||
   '   1, ' ||
   '   null,' ||
   '   null,' ||
   '   null,' ||
   '   null;');

INSERT $VIEWDB.V3346_CALC_ENGINE_TABLE_REF
SELECT :vNextSQLKey,
    :vPCType,
    :SumTbl_woDB;

/*** Create and load Total table *****/
SET vSQLStmt =
    '''CREATE SET TABLE ' || SumTbl_Tots        ||
    ' (Profit_Scenario_Id INTEGER, '           ||
    ' Profit_Rule_Id INTEGER, '             ||
    ' Relates_Obj_Num ' || vDTAssoc || ','       ||
```

```
    ' Relates_Obj_Modifier_Num ' || vDTAssocMod || ',' ||
    ' Drv_Amt  DECIMAL(18,4)) '        ||
    ' PRIMARY INDEX ( Profit_Rule_Id, '        ||
    '         Profit_Scenario_Id );"';

SET vNextSQLKey = vNextSQLKey + 1;
CALL DBC.SysExecSQL
    ('INS $VIEWDB.V3340_CALC_ENGINE_SQL '  ||
    ' sel ' || :vNextSQLKey || ', ' ||
        :vPCType|| ', ' ||
    '   2, ' ||
    '   435, ' ||
    '   20, ' ||
        :vSQLStmt|| ', ' ||
    '   null,' ||
    '   null,' ||
    '   null,' ||
    '   1, ' ||
    '   null,' ||
    '   null,' ||
    '   null,' ||
    '   null;');

End if;

Set ABS_Flag = 'X';
Set Working_Rule_Id = 0;

FOR RunRow as IOCursor CURSOR FOR
SELECT t3444.Profit_Rule_Id,
    t3444.Drv_Metric_Cd,
    t3356.Trg_Amortization_Ind_Cd,
    zeroifnull(t3356.Src_Type_Cd) as Src_type_Cd,
    zeroifnull(T3356.Src_Linkage_Object_Type_Rel_Id) as
Src_Linkage_Object_Type_Rel_Id,
    zeroifnull(t3356.src_object_type_cd) as src_object_type_cd,
    t3356.Drv_Selection_Method_Cd,
    t3356.trg_object_type_cd,
    t3356.Drv_Object_type_cd,
    t3356.trg_object_type_categ_cd,
    T3356.Drv_Linkage_Type_Cd ,
    T3356.Drv_Linkage_Object_Type_Rel_Id ,
    zeroifnull(t3356.Src_Multiplier_Rate) as Src_Multiplier_Rate,
    T3334.Sign_Adjustment_Val,
```

```
      m0035.object_type_categ_cd
FROM  $VIEWDB.V3347_CALC_ENGINE_WIP_SUBSET t3347,
      $VIEWDB.V3356_PROFIT_RULEX              t3356,
      $VIEWDB.V3444_PROFIT_RULE_DRV_METRIC    t3444,
      $VIEWDB.V3334_RULE_CHAIN_METRIC_USAGE   T3334,
      $VIEWDB.V0035_Analytic_Soln_Obj_type    M0035
WHERE T3347.Profit_Rule_Id = T3356.Profit_Rule_Id
  AND T3356.Profit_Rule_Id = T3444.Profit_Rule_Id
  AND T3444.Drv_Metric_Cd = T3334.Metric_Cd
  AND t3356.drv_object_type_cd = m0035.object_type_cd
  AND m0035.Analytic_Solution_cd = 1
ORDER BY 1,2
DO Set Crit_or_All_Cd = runrow.Drv_Selection_Method_Cd;
IF Crit_or_all_cd = 0  / Selection Criteria /
Then
   Set Curr_Rel_Id = runrow.Src_Linkage_Object_Type_Rel_Id;
Else
   Set Curr_Rel_Id = runrow.Drv_Linkage_Object_Type_Rel_Id;
End if;

Select
   Relates_Object_type_cd ,
   Related_Object_type_cd
Into :Src_Relates,
     :Src_Related
From
   $VIEWDB.V0032_Object_Type_Relation
Where Object_type_Rel_Id = :Curr_Rel_Id;

If RunRow.Trg_Object_type_cd = Src_Relates
Then
   Set SelRelate  = 'Relates';
   Set JoinRelate = 'Related';
Else
   Set SelRelate  = 'Related';
   Set JoinRelate = 'Relates';
End if;
If Crit_or_all_cd = 0
Then
   Set JoinRelate = SelRelate;
End if;

Set Src_Rel_Id = runrow.Src_Linkage_Object_Type_Rel_Id;
```

```
Select
   Relates_Object_type_cd,
   Related_Object_type_cd
Into :Src_Relates,
   :Src_Related
From
   $VIEWDB.V0032_Object_Type_Relation
Where Object_type_Rel_Id = :Src_Rel_Id;

Set Prev_Metric_Cd = RunRow.Drv_Metric_Cd;
CASE Prev_Metric_Cd
   WHEN '11' THEN SET Prev_Metric_Txt = 'AB';
   WHEN '10' THEN SET Prev_Metric_Txt = 'AC';
   WHEN '3' THEN SET Prev_Metric_Txt = 'DE';
   WHEN '2' THEN SET Prev_Metric_Txt = 'OR';
   WHEN '5' THEN SET Prev_Metric_Txt = 'RP';
   WHEN '4' THEN SET Prev_Metric_Txt = 'IE';
   WHEN '21' THEN SET Prev_Metric_Txt = 'EAC';
   WHEN '31' Then SET Prev_Metric_Txt = 'NOE';
   WHEN '1' Then SET Prev_Metric_Txt = 'NIR';
END CASE;

Set Trg_Amort_Ind = runrow.Trg_Amortization_Ind_Cd;
Set Crit_or_All_Cd = runrow.Drv_Selection_Method_Cd;
Set Src_Mult_Rate = runrow.Src_Multiplier_Rate;
Set Trg_Obj_type_cd = RunRow.Trg_Object_type_cd;

If Trg_Obj_type_cd = Src_Relates
Then
  Set SrcRelate  = 'Related';
  Set SrcRelated = 'Relates';
Else
  Set SrcRelate  = 'Relates';
  Set SrcRelated = 'Related';
End if;

Set Curr_Categ_Cd = runrow.trg_object_type_categ_cd;
If Curr_Categ_Cd = 1
Then
   Set vSelectorTrgTbl = vViewdb|| '.V3350_'|| PCCode || '_BASE_OBJ_TRG ';
   Set SelTrgKeyA = 'Base_Obj_Num';
   Set SelTrgKeyB = 'Base_Obj_Modifier_Num';
```

```
Else
    Set vSelectorTrgTbl = vViewdb|| '.V3351_' || PCCode ||
'_ASSOCIATE_OBJ_TRG ';
    Set SelTrgKeyA = 'Associate_Obj_Num' ;
    Set SelTrgKeyB = 'Associate_Obj_Modifier_Num';
End if;

Set Drv_Obj_type_cd = RunRow.Drv_Object_type_cd;
Set Prev_Categ_Cd = runrow.object_type_categ_cd;
If Prev_Categ_Cd = 1   /** BASE **/
Then
    SET vBC2Source   = vViewdb   || '.V3363_' ||
            Prev_Metric_Txt   || '_BASE_OBJ_RESULT';
    SET PrevRsltKeyA = ' Base_Obj_Num' ;
    SET PrevRsltKeyB = ' Base_Obj_Modifier_Num';
    If Prev_Metric_Txt <> 'NIR'
    Then
      SET PrevRsltAmtCol = ' Base_Obj_Metric_Amt';
    Else
      SET PrevRsltAmtCol = ' Base_Obj_NIR_Amt';
    End if;
    Set vSelectorDrvTbl = vViewdb|| '.V3453_' || PCCode ||
'_BASE_OBJ_DRV ';
    Set Where_Obj_Typ = 'BASE';
    Set Asst_Rslt_Obj_typ = ' ';
  Else       /** 2 is ASSOCIATE **/
    SET vBC2Source   = vViewdb   || '.V3373_' ||
            Prev_Metric_Txt   || '_ASSOCIATE_OBJ_RESULT';
    SET PrevRsltKeyA = ' Associate_Obj_Num'   ;
    SET PrevRsltKeyB = ' Associate_Obj_Modifier_Num';
    If Prev_Metric_Txt <> 'NIR'
    Then
      SET PrevRsltAmtCol = ' Associate_Obj_Metric_Amt';
    Else
      SET PrevRsltAmtCol = ' Assoc_Obj_NIR_Amt';
    End if;
    Set vSelectorDrvTbl = vViewdb|| '.V3454_' || PCCode ||
'_ASSOCIATE_OBJ_DRV ';
    Set Where_Obj_Typ = 'Associate';
    Set Asst_Rslt_Obj_typ = ' And Rslt.Object_Type_Cd =
'||Drv_Obj_type_cd ;
  End if;

Set Working_Src_Type_Cd = runrow.Src_type_cd;
Set Curs_Rule_Id = runrow.Profit_Rule_Id;
```

Set SignVal = runrow.Sign_Adjustment_Val;

If Curs_Rule_Id <> Working_Rule_Id
Then

/** signage processing */
  If ABS_flag = 'N'
  then

SET vSQLStmt =
      '''UPDATE ' || SumTbl_wDB       || ' t3168 '||
      ' SET Trg_Obj_Rule_Amt = t3168.Trg_Obj_Rule_Amt * -1.00 ' ||
      ' WHERE  T3168.Profit_Rule_Id    = '||Working_Rule_id||
      ';''' ;

SET vNextSQLKey = vNextSQLKey + 1;
  CALL DBC.SysExecSQL
  ('INS $VIEWDB.V3340_CALC_ENGINE_SQL '   ||
   ' sel ' || :vNextSQLKey || ', ' ||
   :vPCType || ', ' ||
    '   2, ' ||
    '  435, ' ||
    '   30, ' ||
    :vSQLStmt|| ', ' ||
    '  null,' ||
    '  null,' ||
    '  null,' ||
    '   1, ' ||
    '  null,' ||
    '  null,' ||
    '  null,' ||
    '  null;');

Else
    Set ABS_flag = 'N';
  End if;

If Working_Rule_Id <> 0
Then

SET vSQLStmt =
     '''INSERT ' || SumTbl_Tots     ||

```
        ' SELECT DrvTbl.Profit_Scenario_Id, '   ||
        '       DrvTbl.Profit_Rule_Id , '       ||
        '       Relates_Obj_Num ,'              ||
        '       Relates_Obj_Modifier_Num ,'     ||
        '       sum(Trg_Obj_Rule_Amt) '         ||
        ' FROM ' || SumTbl_wDB    ||' DrvTbl '||
        ' WHERE DrvTbl.Profit_Rule_Id = '||Working_Rule_Id ||
        ' group by 1,2,3,4 ' ||
        ''.''' ;

SET vNextSQLKey = vNextSQLKey + 1;
     CALL DBC.SysExecSQL
     ('INS $VIEWDB.V3340_CALC_ENGINE_SQL '   ||
       ' sel ' || :vNextSQLKey || ', ' ||
          :vPCType|| ', '      ||
        '    2,      ' ||
        '  435, '      ||
        '   20, '      ||
          :vSQLStmt|| ', '     ||
        '    null,'   ||
        '    null,'   ||
        '    null,'   ||
        '    1,    '  ||
        '    null,'   ||
        '    null,'   ||
        '    null,'   ||
        '    null;');

End if;

If Working_Src_Type_Cd > 1
Then

If drv_obj_type_cd = Trg_obj_type_cd
Then
IF Crit_or_all_cd = 2   /** Selection Criteria **/
Then SET vSQLStmt =
  '''INSERT /*1*/' || SumTbl_wDB              ||
  ' SELECT Rslt.Profit_Scenario_Id, '     ||
        Curs_Rule_Id   ||', '||
  '     T3320s.'||SelRelate||'_Obj_Num,'          ||
  '     T3320s.'||SelRelate||'_Obj_Modifier_Num,' ||
  '     T3320s.'||SrcRelate||'_Obj_Num,'          ||
```

```
'       T3320s.'||SrcRelate||'_Obj_Modifier_Num,'||
'       SelTrg.Drv_Detail_Val, '         ||
        trg_amort_Ind       ||','||
        Src_Mult_Rate       ||','||
        'sum(Rslt.'||PrevRsltAmtCol || ') * '|| SignVal ||
'FROM '|| vBC2Source   ||' Rslt, '||
        vDynSQLdb || '.' || 'V3320_ALL_RELATIONS T3320s, ' ||
'       '|| vSelectorTrgTbl||' SELTrg ,'||
'       '|| vSelectorDrvTbl||' SELMET' ||
'WHERE  SELMET.Profit_Rule_Id = '||Curs_Rule_Id ||
'  and  SELTRG.Profit_Rule_Id = '||Curs_Rule_Id ||
'  And  T3320s.Object_Type_Rel_Id = '||Src_Rel_Id ||
'  And  SELMET.'||Where_Obj_typ||'_Obj_Num =
 T3320s.'||SrcRelated||'_Obj_Num  '||
'  And  SELMET.'||Where_Obj_Typ||'_Obj_Modifier_Num =
 T3320s.'||SrcRelated||'_Obj_Modifier_Num '||
'  And  T3320s.'||SrcRelated||'_Obj_Num = SelTrg.'||SelTrgKeyA ||
'  And  T3320s.'||SrcRelated||'_Obj_Modifier_Num =
 SelTrg.'||SelTrgKeyB ||
'  And  Rslt.'||PrevRsltKeyA ||' = T3320s.'||SrcRelated||'_Obj_Num  '||
'  And  Rslt.'||PrevRsltKeyB|| ' =
 T3320s.'||SrcRelated||'_Obj_Modifier_Num '||
        Asst_Rslt_Obj_typ ||
'  And Rslt.Profit_scenario_id in '||
'  (select distinct profit_scenario_id from
 $VIEWDB.v3266_profit_run_scenario_rule '||
'    Where profit_rule_id = '||curs_rule_id||')'||
'  group by 1,2,3,4,5,6,7,8,9 '||
';''' ;
IF vSQLStmt is null
    then set VSQLStmt = '''/**ERROR1:  This statement was nulled
 out.**/''';
    end if;

Else   /** all **/

SET vSQLStmt =
'''INSERT /*2*/' || SumTbl_wDB           ||
' SELECT Rslt.Profit_Scenario_Id, '    ||
        Curs_Rule_Id  ||', '||
'       T3320s.'||SelRelate||'_Obj_Num,'        ||
'       T3320s.'||SelRelate||'_Obj_Modifier_Num,'||
'       T3320s.'||SrcRelate||'_Obj_Num,'        ||
'       T3320s.'||SrcRelate||'_Obj_Modifier_Num,'||
'       SelTrg.Drv_Detail_Val, '        ||
        trg_amort_Ind       ||','||
```

```
            Src_Mult_Rate      ||','||
        'sum(Rslt.'||PrevRsltAmtCol || ') * ' || SignVal ||
    'FROM ' || vBC2Source   ||' Rslt, ' ||
    '    ' || vSelectorTrgTbl||' SELTrg,' ||
          vDynSQLdb || '.' || 'V3320_ALL_RELATIONS T3320s ' ||
    'WHERE Rslt.'||PrevRsltKeyA ||' = T3320s.'||SrcRelated||'_Obj_Num '
||
    '   And Rslt.'||PrevRsltKeyB|| ' =
T3320s.'||SrcRelated||'_Obj_Modifier_Num '||
        Asst_Rslt_Obj_typ ||
    '   and SELTRG.Profit_Rule_Id = '||Curs_Rule_Id ||
    '   And T3320s.'||SrcRelated||'_Obj_Num = SelTrg.'||SelTrgKeyA ||
    '   And T3320s.'||SrcRelated||'_Obj_Modifier_Num =
SelTrg.'||SelTrgKeyB ||
    '   And T3320s.Object_Type_Rel_Id = ' ||Src_Rel_Id ||
    '   And Rslt.Profit_scenario_id in ' ||
    ' (select distinct profit_scenario_id from
$VIEWDB.v3266_profit_run_scenario_rule '||
    '  Where profit_rule_id = '||curs_rule_id||' )'||
    ' group by 1,2,3,4,5,6,7,8,9 ' ||
    ','''  ;
    IF vSQLStmt is null
      then set VSQLStmt = '''/**ERROR2: This statement was nulled
out.**/''';
      end if;
    End if;

Else
  IF Crit_or_all_cd = 2   /** Selection Criteria **/
  Then

SET vSQLStmt =
    '''INSERT /*1*/' || SumTbl_wDB          ||
    ' SELECT Rslt.Profit_Scenario_Id, '    ||
        Curs_Rule_Id   ||',  '||
    '    T3320.'||SelRelate||'_Obj_Num,'       ||
    '    T3320.'||SelRelate||'_Obj_Modifier_Num,' ||
    '    T3320s.'||SrcRelate||'_Obj_Num,'      ||
    '    T3320s.'||SrcRelate||'_Obj_Modifier_Num,' ||
    '    SelTrg.Drv_Detail_Val, '        ||
        trg_amort_Ind      ||','||
        Src_Mult_Rate     ||','||
        'sum(Rslt.'||PrevRsltAmtCol || ') * ' || SignVal ||
    'FROM ' || vBC2Source  ||' Rslt, ' ||
          vDynSQLdb || '.' || 'V3320_ALL_RELATIONS T3320, ' ||
          vDynSQLdb || '.' || 'V3320_ALL_RELATIONS T3320s, ' ||
```

```
        '   ' || vSelectorTrgTbl||' SELTrg ,' ||
        '   ' || vSelectorDrvTbl||' SELMET' ||
        ' WHERE  SELMET.Profit_Rule_Id = '||Curs_Rule_Id ||
        '  and  SELTRG.Profit_Rule_Id = '||Curs_Rule_Id ||
        ' And T3320.Object_Type_Rel_Id = ' ||Curr_Rel_Id ||
        ' And T3320s.Object_Type_Rel_Id = ' ||Src_Rel_Id ||
        ' And  SELMET.'||Where_Obj_typ||'_Obj_Num =
T3320.'||JoinRelate||'_Obj_Num ' ||
        'And  SELMET.'||Where_Obj_Typ||'_Obj_Modifier_Num =
T3320.'||JoinRelate||'_Obj_Modifier_Num '||
        'And  T3320.'||SelRelate||'_Obj_Num = SelTrg.'||SelTrgKeyA ||
        'And  T3320.'||SelRelate||'_Obj_Modifier_Num = SelTrg.'||SelTrgKeyB
||
        'And  Rslt.'||PrevRsltKeyA ||' = T3320.'||JoinRelate||'_Obj_Num  ' ||
        'And  Rslt.'||PrevRsltKeyB|| ' =
T3320.'||JoinRelate||'_Obj_Modifier_Num '||
            Asst_Rslt_Obj_typ ||
        'And  T3320s.'||SrcRelated||'_Obj_Num = SelTrg.'||SelTrgKeyA ||
        'And  T3320s.'||SrcRelated||'_Obj_Modifier_Num =
SelTrg.'||SelTrgKeyB ||
        ' And Rslt.Profit_scenario_id in ' ||
        ' (select distinct profit_scenario_id from
$VIEWDB.v3266_profit_run_scenario_rule '||
        ' Where profit_rule_id = '||curs_rule_id||')'||
        ' group by 1,2,3,4,5,6,7,8,9 ' ||
        '.''' ;
        IF vSQLStmt is null
            then set VSQLStmt = '''/**ERROR1:  This statement was nulled
out.**/''';
        end if;

Else    /** all **/

SET vSQLStmt =
        '''INSERT /*2*/' || SumTbl_wDB          ||
        ' SELECT Rslt.Profit_Scenario_Id, '     ||
              Curs_Rule_Id  ||', '||
        '       T3320.'||SelRelate||'_Obj_Num,'      ||
        '       T3320.'||SelRelate||'_Obj_Modifier_Num,' ||
        '       T3320s.'||SrcRelate||'_Obj_Num,'     ||
        '       T3320s.'||SrcRelate||'_Obj_Modifier_Num,' ||
        '       SelTrg.Drv_Detail_Val, '        ||
                trg_amort_Ind      ||','||
                Src_Mult_Rate      ||','||
                'sum(Rslt.'||PrevRsltAmtCol || ') * ' || SignVal ||
        ' FROM ' || vBC2Source   ||' Rslt, ' ||
```

```
      '  '|| vSelectorTrgTbl||' SELTrg,'||
         vDynSQLdb || '.'|| 'V3320_ALL_RELATIONS T3320s, ' ||
         vDynSQLdb || '.'|| 'V3320_ALL_RELATIONS T3320 ' ||
   'WHERE Rslt.'||PrevRsltKeyA ||' = T3320.'||JoinRelate||'_Obj_Num '||
   ' And Rslt.'||PrevRsltKeyB|| ' =
T3320.'||JoinRelate||'_Obj_Modifier_Num '||
         Asst_Rslt_Obj_typ ||
      ' and  SELTRG.Profit_Rule_Id = '||Curs_Rule_Id ||
      ' And  T3320.'||SelRelate||'_Obj_Num = SelTrg.'||SelTrgKeyA ||
      ' And  T3320.'||SelRelate||'_Obj_Modifier_Num =
SelTrg.'||SelTrgKeyB ||
      ' And T3320.Object_Type_Rel_Id = '||Curr_Rel_Id ||
      ' And T3320s.Object_Type_Rel_Id = '||Src_Rel_Id ||
      ' And  T3320s.'||SrcRelated||'_Obj_Num = SelTrg.'||SelTrgKeyA ||
      ' And  T3320s.'||SrcRelated||'_Obj_Modifier_Num =
SelTrg.'||SelTrgKeyB ||
      ' And Rslt.Profit_scenario_id in '||
      ' (select distinct profit_scenario_id from
$VIEWDB.v3266_profit_run_scenario_rule '||
      ' Where profit_rule_id = '||curs_rule_id||' )'||
      ' group by 1,2,3,4,5,6,7,8,9 '||
       ''''  ;
      IF vSQLStmt is null
         then set VSQLStmt = '''/**ERROR2: This statement was nulled
out.**/''';
      end if;

End if;
   End if;
   Else   /** All **/

If drv_obj_type_cd = trg_obj_type_cd
   Then

IF Crit_or_all_cd = 2   /** Selection Criteria **/
   Then
   /* Load first set of results (signed) **/
      SET vSQLStmt =
      '''INSERT '|| SumTbl_wDB           ||
      ' SELECT  Rslt.Profit_Scenario_Id, '   ||
            Curs_Rule_Id          ||','||
      '   Rslt.'||PrevRsltKeyA||',  '||
```

```
'       Rslt.'||PrevRsltKeyB||', '||
'       0,'         ||
'       0,'||
'       SelTrg.Drv_Detail_Val, '        ||
        trg_amort_Ind     ||','||
        Src_Mult_Rate     ||','||
       'sum(Rslt.'||PrevRsltAmtCol || ') * ' || SignVal ||
'FROM ' || vBC2Source   ||' Rslt, '||
'       ' || vSelectorTrgTbl||' SELTrg ,'||
'       ' || vSelectorDrvTbl ||' SELMET '||
'WHERE   SELMET.Profit_Rule_Id = '||Curs_Rule_Id ||
'AND     SELTrg.Profit_Rule_Id = '||Curs_Rule_Id ||
'AND     Rslt.'||PrevRsltKeyA||' '||' =
SELMET.'||Where_Obj_Typ||'_Obj_Num '||
'AND     Rslt.'||PrevRsltKeyB||' '||' =
SELMET.'||Where_Obj_Typ||'_Obj_Modifier_Num  '||
'AND     Rslt.'||PrevRsltKeyA||' '||' = SelTrg.'||SelTrgKeyA ||
'AND     Rslt.'||PrevRsltKeyB||' '||' = SelTrg.'||SelTrgKeyB ||
'   group by 1,2,3,4,5,6,7,8,9 '||
';''' ;

Else            /*** All ***/

SET vSQLStmt =
'''INSERT '|| SumTbl_wDB          ||
' SELECT  Rslt.Profit_Scenario_Id,'   ||
        Curs_Rule_Id      ||', '||
'       Rslt.'||PrevRsltKeyA||', '||
'       Rslt.'||PrevRsltKeyB||', '||
'       0,'         ||
'       0,'||
'       SelTrg.Drv_Detail_Val, '        ||
        trg_amort_Ind     ||','||
        Src_Mult_Rate     ||','||
       'sum(Rslt.'||PrevRsltAmtCol || ') * ' || SignVal ||
'FROM ' || vBC2Source   ||' Rslt, '||
'       ' || vSelectorTrgTbl||' SELTrg '||
'WHERE   SELTrg.Profit_Rule_Id = '||Curs_Rule_Id ||
'AND     Rslt.'||PrevRsltKeyA||' '||' = SelTrg.'||SelTrgKeyA ||
'AND     Rslt.'||PrevRsltKeyB||' '||' = SelTrg.'||SelTrgKeyB ||
'   group by 1,2,3,4,5,6,7,8,9 '||
';''' ;

End if;
Else
```

```
IF Crit_or_all_cd = 2   /** Selection Criteria **/
Then

SET vSQLStmt =
    '"INSERT /*3*/' || SumTbl_wDB           ||
    ' SELECT Rslt.Profit_Scenario_Id, '     ||
            Curs_Rule_Id          ||', '||
    '       T3320.'||SelRelate||'_Obj_Num,'       ||
    '       T3320.'||SelRelate||'_Obj_Modifier_Num,' ||
    '       0,'       ||
    '       0,' ||
    '       SelTrg.Drv_Detail_Val, '         ||
            trg_amort_Ind         ||','||
            Src_Mult_Rate         ||','||
            'sum(Rslt.'||PrevRsltAmtCol || ') * ' || SignVal ||
    ' FROM ' || vBC2Source  ||' Rslt, ' ||
              vDynSQLdb || '.' || 'V3320_ALL_RELATIONS T3320, '  ||
    '       ' || vSelectorTrgTbl||' SELTrg ,' ||
    '       ' || vSelectorDrvTbl||' SELMET' ||
    ' WHERE    SELMET.Profit_Rule_Id = '||Curs_Rule_Id ||
    '  and   SELTRG.Profit_Rule_Id = '||Curs_Rule_Id ||
    '  And  T3320.Object_Type_Rel_Id = ' ||Curr_Rel_Id ||
    '  And  SELMET.'||Where_Obj_typ||'_Obj_Num =
T3320.'||JoinRelate||'_Obj_Num '||
    ' And  SELMET.'||Where_Obj_Typ||'_Obj_Modifier_Num =
T3320.'||JoinRelate||'_Obj_Modifier_Num '||
    ' And  ~~T3320.~~'||SelRelate||'~~_Obj_Num = SelTrg.~~'||SelTrgKeyA ||
    ' And  T3320.'||SelRelate||'_Obj_Modifier_Num =
SelTrg.'||SelTrgKeyB ||
    ' And  Rslt.'||PrevRsltKeyA ||' = T3320.'||JoinRelate||'_Obj_Num '||
    ' And  Rslt.'||PrevRsltKeyB|| ' =
T3320.'||JoinRelate||'_Obj_Modifier_Num '||
           Asst_Rslt_Obj_typ ||
    ' And Rslt.Profit_scenario_id in ' ||
    ' (select distinct profit_scenario_id from
$VIEWDB.v3266_profit_run_scenario_rule '||
    ' Where profit_rule_id = '||curs_rule_id||')'||
    ' group by 1,2,3,4,5,6,7,8,9 ' ||
    ';''' ;
    IF vSQLStmt is null
    then set VSQLStmt = '"/**ERROR3:  This statement was nulled
out.**/"';
    end if;

Else    /** all **/
```

```
        SET vSQLStmt =
        '"INSERT /*4*/' || SumTbl_wDB          ||
        ' SELECT Rslt.Profit_Scenario_Id, '    ||
                Curs_Rule_Id          ||', '||
        '       T3320.'||SelRelate||'_Obj_Num,'      ||
        '       T3320.'||SelRelate||'_Obj_Modifier_Num,'||
        '       0,'         ||
        '       0,'||
        '       SelTrg.Drv_Detail_Val, '   ||
                trg_amort_Ind     ||','||
                Src_Mult_Rate     ||','||
                'sum(Rslt.'||PrevRsltAmtCol  || ') * '|| SignVal ||
        ' FROM '|| vBC2Source    ||' Rslt, '||
        '       '|| vSelectorTrgTbl||' SELTrg,'||
                vDynSQLdb || '.' || 'V3320_ALL_RELATIONS T3320 ' ||
        ' WHERE Rslt.'||PrevRsltKeyA ||' = T3320.'||JoinRelate||'_Obj_Num '
||
        '   And Rslt.'||PrevRsltKeyB|| ' = '
T3320.'||JoinRelate||'_Obj_Modifier_Num '||
        '   and  SELTRG.Profit_Rule_Id = '||Curs_Rule_Id ||
                Asst_Rslt_Obj_typ ||
        '   And  T3320.'||SelRelate||'_Obj_Num = SelTrg.'||SelTrgKeyA ||
        '   And  T3320.'||SelRelate||'_Obj_Modifier_Num =
SelTrg.'||SelTrgKeyB ||
        '   And T3320.Object_Type_Rel_Id = ' ||Curr_Rel_Id ||
        '   And Rslt.Profit_scenario_id in ' ||
        ' (select distinct profit_scenario_id from
$VIEWDB.v3266_profit_run_scenario_rule '||
        ' Where profit_rule_id = '||curs_rule_id||' )'||
        ' group by 1,2,3,4,5,6,7,8,9 ' ||
        ';"' ;
        IF vSQLStmt is null
          then set VSQLStmt = '"/**ERROR4: This statement was nulled
out.**/"';
          end if;

End if;

End if;
End if;

SET vNextSQLKey = vNextSQLKey + 1;
        CALL DBC.SysExecSQL
          ('INS $VIEWDB.V3340_CALC_ENGINE_SQL '  ||
```

```
   ' sel ' || :vNextSQLKey || ', ' ||
      :vPCType|| ', ' ||
'   2,  ' ||
'   435, ' ||
'   20,  ' ||
      :vSQLStmt|| ', ' ||
'   null,' ||
'   null,' ||
'   null,' ||
'   1,  ' ||
'   null,' ||
'   null,' ||
'   null,' ||
'   null;');

Set Working_Rule_Id = Curs_Rule_Id;

Else
   If POCODE = 'ASST'
   Then
      SET SumTbl_tempwoDB = 'W3168_Metric_Sum_Drv_Temp';
      SET SumTbl_tempwDB = vDynSQLdb ||
'.W3168_Metric_Sum_Drv_Temp';
   Else
      SET SumTbl_tempwoDB = 'W3168_BASE_Metric_Sum_Drv_Temp';
      SET SumTbl_tempwDB = vDynSQLdb ||
'.W3168_BASE_Metric_Sum_Drv_Temp';
   End if;

/***********************************************************************
If the Prev Sum TEMP Table already exists, then skip Create Table, else Create
***********************************************************************/
   SEL count(*)
   INTO :vRowCount
   FROM $VIEWDB.V3346_CALC_ENGINE_TABLE_REF
   WHERE Calc_Engine_Table_Name = :SumTbl_tempwoDB;

IF vRowCount = 0
   THEN
      If POCODE = 'ASST'
      Then
```

```
SET vSQLStmt =
  "'CREATE SET TABLE ' || SumTbl_tempwDB         ||
  ' (Profit_Scenario_Id INTEGER, '                ||
  ' Profit_Rule_Id INTEGER, '                     ||
  ' Trg_Associate_Obj_Num ' || vDTAssoc || ','    ||
  ' Trg_Associate_Obj_Modifier_Num ' || vDTAssocMod || ','||
  ' Relates_Obj_Num ' || vDTAssoc || ','          ||
  ' Relates_Obj_Modifier_Num ' || vDTAssocMod || ','||
  ' Drv_Detail_Val VARCHAR(50) , '                ||
  ' Trg_Amortization_Ind_Cd SMALLINT,'            ||
  ' Src_Multiplier_Rate DECIMAL(15,12), '         ||
  ' Trg_Obj_Rule_Amt  DECIMAL(18,4)) '            ||
  ' PRIMARY INDEX ( Profit_Rule_Id, '             ||
  '          Profit_Scenario_Id , '               ||
  '          Trg_Associate_Obj_Num, '             ||
  '          Trg_Associate_Obj_Modifier_Num, '    ||
  '          Relates_Obj_Num, '                   ||
  '          Relates_Obj_Modifier_Num );'";

Else
  SET vSQLStmt =
  "'CREATE SET TABLE ' || SumTbl_tempwDB         ||
  ' (Profit_Scenario_Id INTEGER, '                ||
  ' Profit_Rule_Id INTEGER, '                     ||
  ' Trg_Associate_Obj_Num ' || vDTBase || ','     ||
  ' Trg_Associate_Obj_Modifier_Num ' || vDTBaseMod || ','||
  ' Relates_Obj_Num ' || vDTAssoc || ','          ||
  ' Relates_Obj_Modifier_Num ' || vDTAssocMod || ','||
  ' Drv_Detail_Val VARCHAR(50) , '                ||
  ' Trg_Amortization_Ind_Cd SMALLINT,'            ||
  ' Src_Multiplier_Rate DECIMAL(15,12), '         ||
  ' Trg_Obj_Rule_Amt  DECIMAL(18,4)) '            ||
  ' PRIMARY INDEX ( Profit_Rule_Id, '             ||
  '          Profit_Scenario_Id , '               ||
  '          Trg_Associate_Obj_Num, '             ||
  '          Trg_Associate_Obj_Modifier_Num, '    ||
  '          Relates_Obj_Num, '                   ||
  '          Relates_Obj_Modifier_Num );'";
End if;

INSERT $VIEWDB.V3346_CALC_ENGINE_TABLE_REF
SELECT :vNextSQLKey,
  :vPCType,
  :SumTbl_tempwoDB;
Else
```

```
SET vSQLStmt =
  '''Delete ' || SumTbl_tempwDB || ';''' ;

End if;

SET vNextSQLKey = vNextSQLKey + 1;
CALL DBC.SysExecSQL
   ('INS $VIEWDB.V3340_CALC_ENGINE_SQL ' ||
    ' sel ' || :vNextSQLKey || ', ' ||
        :vPCType|| ', ' ||
   '   2, ' ||
   ' 435, ' ||
   '  20, ' ||
        :vSQLStmt|| ', ' ||
   '  null,' ||
   '  null,' ||
   '  null,' ||
   '   1, ' ||
   '  null,' ||
   '  null,' ||
   '  null,' ||
   '  null;');

If Working_Src_Type_Cd > 1
Then

If drv_obj_type_cd = Trg_obj_type_cd
Then
IF Crit_or_all_cd = 2   /** Selection Criteria **/
Then SET vSQLStmt =
  '''INSERT /*1*/' || SumTbl_tempwDB           ||
  ' SELECT Rslt.Profit_Scenario_Id, '      ||
        Curs_Rule_Id   ||', '||
   '    T3320s.'||SelRelate||'_Obj_Num,'        ||
   '    T3320s.'||SelRelate||'_Obj_Modifier_Num,' ||
   '    T3320s.'||SrcRelate||'_Obj_Num,'        ||
   '    T3320s.'||SrcRelate||'_Obj_Modifier_Num,' ||
   '    SelTrg.Drv_Detail_Val, '           ||
        trg_amort_Ind       ||','||
        Src_Mult_Rate      ||','||
       'sum(Rslt.'||PrevRsltAmtCol || ') * ' || SignVal ||
```

```
' FROM ' || vBC2Source    ||' Rslt, ' ||
        vDynSQLdb || '.' || 'V3320_ALL_RELATIONS T3320s, '  ||
'    ' || vSelectorTrgTbl||' SELTrg ,' ||
'    ' || vSelectorDrvTbl||' SELMET' ||
' WHERE  SELMET.Profit_Rule_Id = '||Curs_Rule_Id ||
'  and  SELTRG.Profit_Rule_Id = '||Curs_Rule_Id ||
'  And  T3320s.Object_Type_Rel_Id = ' ||Src_Rel_Id ||
'  And  SELMET.'||Where_Obj_typ||'_Obj_Num =
T3320s.'||SrcRelated||'_Obj_Num ' ||
'  And  SELMET.'||Where_Obj_Typ||'_Obj_Modifier_Num =
T3320s.'||SrcRelated||'_Obj_Modifier_Num '||
'  And  T3320s.'||SrcRelated||'_Obj_Num = SelTrg.'||SelTrgKeyA ||
'  And  T3320s.'||SrcRelated||'_Obj_Modifier_Num =
SelTrg.'||SelTrgKeyB ||
'  And  Rslt.'||PrevRsltKeyA ||' = T3320s.'||SrcRelated||'_Obj_Num ' ||
'  And  Rslt.'||PrevRsltKeyB|| ' =
T3320s.'||SrcRelated||'_Obj_Modifier_Num '||
    Asst_Rslt_Obj_typ ||
'  And Rslt.Profit_scenario_id in ' ||
'  (select distinct profit_scenario_id from
$VIEWDB.v3266_profit_run_scenario_rule '||
'   Where profit_rule_id = '||curs_rule_id||' )'||
'  group by 1,2,3,4,5,6,7,8,9 ' ||
''.''' ;
    IF vSQLStmt is null
    then set VSQLStmt = '''/**ERROR1: This statement was nulled
out.**/''';
    end if;

Else   /** all **/

SET vSQLStmt =
'''INSERT /*2*/' || SumTbl_tempwDB       ||
' SELECT Rslt.Profit_Scenario_Id, '    ||
    Curs_Rule_Id   ||', '||
'    T3320s.'||SelRelate||'_Obj_Num,'       ||
'    T3320s.'||SelRelate||'_Obj_Modifier_Num,' ||
'    T3320s.'||SrcRelate||'_Obj_Num,'       ||
'    T3320s.'||SrcRelate||'_Obj_Modifier_Num,' ||
'    SelTrg.Drv_Detail_Val, '       ||
    trg_amort_Ind     ||','||
    Src_Mult_Rate     ||','||
    'sum(Rslt.'||PrevRsltAmtCol || ') * ' || SignVal ||
' FROM ' || vBC2Source     ||' Rslt, ' ||
'    ' || vSelectorTrgTbl||' SELTrg,' ||
        vDynSQLdb || '.' || 'V3320_ALL_RELATIONS T3320s ' ||
```

```
        ' WHERE Rslt.'||PrevRsltKeyA ||' = T3320s.'||SrcRelated||'_Obj_Num '
||
        ' And Rslt.'||PrevRsltKeyB|| ' =
T3320s.'||SrcRelated||'_Obj_Modifier_Num '||
          Asst_Rslt_Obj_typ ||
        ' and  SELTRG.Profit_Rule_Id = '||Curs_Rule_Id ||
        ' And  T3320s.'||SrcRelated||'_Obj_Num = SelTrg.'||SelTrgKeyA ||
        ' And  T3320s.'||SrcRelated||'_Obj_Modifier_Num =
SelTrg.'||SelTrgKeyB ||
           ' And T3320s.Object_Type_Rel_Id = ' ||Src_Rel_Id ||
           ' And Rslt.Profit_scenario_id  in ' ||
           ' (select distinct profit_scenario_id from
$VIEWDB.v3266_profit_run_scenario_rule '||
           ' Where profit_rule_id = '||curs_rule_id||')'||
           ' group by 1,2,3,4,5,6,7,8,9 ' ||
           '.''' ;
        IF vSQLStmt is null
        then set VSQLStmt = '''/**ERROR2:  This statement was nulled
out.**/''';
        end if;
     End if;

Else
     IF Crit_or_all_cd = 2    /** Selection Criteria **/
     Then

SET vSQLStmt =
        '''INSERT /*1*/' || SumTbl_tempwDB            ||
        ' SELECT Rslt.Profit_Scenario_Id, '      ||
           Curs_Rule_Id     ||', '||
        '     T3320.'||SelRelate||'_Obj_Num,'          ||
        '     T3320.'||SelRelate||'_Obj_Modifier_Num,' ||
        '     T3320s.'||SrcRelate||'_Obj_Num,'         ||
        '     T3320s.'||SrcRelate||'_Obj_Modifier_Num,' ||
        '     SelTrg.Drv_Detail_Val, '            ||
           trg_amort_Ind      ||','||
           Src_Mult_Rate      ||','||
           'sum(Rslt.'||PrevRsltAmtCol || ') * ' || SignVal ||
        ' FROM ' || vBC2Source       ||' Rslt, ' ||
            vDynSQLdb || '.' || 'V3320_ALL_RELATIONS T3320, '  ||
            vDynSQLdb || '.' || 'V3320_ALL_RELATIONS T3320s, ' ||
        '     ' || vSelectorTrgTbl||' SELTrg ,' ||
        '     ' || vSelectorDrvTbl||' SELMET' ||
        ' WHERE  SELMET.Profit_Rule_Id = '||Curs_Rule_Id ||
        ' and  SELTRG.Profit_Rule_Id = '||Curs_Rule_Id ||
        ' And T3320.Object_Type_Rel_Id = ' ||Curr_Rel_Id ||
```

```
        ' And T3320s.Object_Type_Rel_Id = ' ||Src_Rel_Id ||
        ' And  SELMET.'||Where_Obj_typ||'_Obj_Num =
T3320.'||JoinRelate||'_Obj_Num  '||
        'And  SELMET.'||Where_Obj_Typ||'_Obj_Modifier_Num =
T3320.'||JoinRelate||'_Obj_Modifier_Num '||
        'And   T3320.'||SelRelate||'_Obj_Num = SelTrg.'||SelTrgKeyA ||
        'And   T3320.'||SelRelate||'_Obj_Modifier_Num = SelTrg.'||SelTrgKeyB
||
        ' And  Rslt.'||PrevRsltKeyA ||' = T3320.'||JoinRelate||'_Obj_Num  '||
        'And  Rslt.'||PrevRsltKeyB|| ' =
T3320.'||JoinRelate||'_Obj_Modifier_Num '||
            Asst_Rslt_Obj_typ ||
        'And   T3320s.'||SrcRelated||'_Obj_Num = SelTrg.'||SelTrgKeyA ||
        'And   T3320s.'||SrcRelated||'_Obj_Modifier_Num =
SelTrg.'||SelTrgKeyB ||
        'And Rslt.Profit_scenario_id in ' ||
        ' (select distinct profit_scenario_id from
$VIEWDB.v3266_profit_run_scenario_rule '||
        ' Where profit_rule_id = '||curs_rule_id||')'||
        'group by 1,2,3,4,5,6,7,8,9 '||
        '.''' ;
        IF vSQLStmt is null
            then set VSQLStmt = '''/**ERROR1:  This statement was nulled
out.**/''';
        end if;

Else   /** all **/

SET vSQLStmt =
        '''INSERT /*2*/' || SumTbl_tempwDB          ||
        ' SELECT Rslt.Profit_Scenario_Id, '    ||
            Curs_Rule_Id   ||', '||
        '     T3320.'||SelRelate||'_Obj_Num,'       ||
        '     T3320.'||SelRelate||'_Obj_Modifier_Num,'||
        '     T3320s.'||SrcRelate||'_Obj_Num,'      ||
        '     T3320s.'||SrcRelate||'_Obj_Modifier_Num,'||
        '     SelTrg.Drv_Detail_Val, '          ||
            trg_amort_Ind      ||','||
            Src_Mult_Rate       ||','||
            'sum(Rslt.'||PrevRsltAmtCol || ') * '|| SignVal ||
        ' FROM ' || vBC2Source   ||' Rslt, '||
        '    ' || vSelectorTrgTbl||' SELTrg,'||
              vDynSQLdb || '.' || 'V3320_ALL_RELATIONS T3320s, '  ||
              vDynSQLdb || '.' || 'V3320_ALL_RELATIONS T3320 '  ||
        ' WHERE Rslt.'||PrevRsltKeyA ||' = T3320.'||JoinRelate||'_Obj_Num '||
```

```
     ' And Rslt.'||PrevRsltKeyB|| ' =
T3320.'||JoinRelate||'_Obj_Modifier_Num '||
       Asst_Rslt_Obj_typ ||
     ' and  SELTRG.Profit_Rule_Id = '||Curs_Rule_Id ||
     ' And  T3320.'||SelRelate||'_Obj_Num = SelTrg.'||SelTrgKeyA ||
     ' And  T3320.'||SelRelate||'_Obj_Modifier_Num =
SelTrg.'||SelTrgKeyB ||
     ' And T3320.Object_Type_Rel_Id = ' ||Curr_Rel_Id ||
     ' And T3320s.Object_Type_Rel_Id = ' ||Src_Rel_Id ||
     ' And  T3320s.'||SrcRelated||'_Obj_Num = SelTrg.'||SelTrgKeyA ||
     ' And  T3320s.'||SrcRelated||'_Obj_Modifier_Num =
SelTrg.'||SelTrgKeyB ||
     ' And Rslt.Profit_scenario_id  in ' ||
     ' (select distinct profit_scenario_id from
$VIEWDB.v3266_profit_run_scenario_rule '||
     ' Where profit_rule_id = '||curs_rule_id||')'||
     ' group by 1,2,3,4,5,6,7,8,9 ' ||
     '.''' ;
     IF vSQLStmt is null
       then set VSQLStmt = '''/**ERROR2:  This statement was nulled
out.**/''';
     end if;

End if;
  End if;
  Else    /** All **/

If drv_obj_type_cd = trg_obj_type_cd
  Then

IF Crit_or_all_cd = 2   /** Selection Criteria **/
    Then
    /* Load first set of results (signed) **/
      SET vSQLStmt =
      '''INSERT '|| SumTbl_tempwDB          ||
      ' SELECT  Rslt.Profit_Scenario_Id, '   ||
            Curs_Rule_Id         ||', '||
     '      Rslt.'||PrevRsltKeyA||', ' ||
     '      Rslt.'||PrevRsltKeyB||', ' ||
     '      0,'       ||
     '      0,' ||
     '      SelTrg.Drv_Detail_Val, '           ||
```

```
                    trg_amort_Ind      ||','||
                    Src_Mult_Rate      ||','||
                    'sum(Rslt.'||PrevRsltAmtCol || ') * '|| SignVal ||
            ' FROM ' || vBC2Source   ||' Rslt, '||
            '     ' || vSelectorTrgTbl||' SELTrg ,'||
            '     ' || vSelectorDrvTbl ||' SELMET '||
            ' WHERE    SELMET.Profit_Rule_Id  = '||Curs_Rule_Id ||
            ' AND      SELTrg.Profit_Rule_Id  = '||Curs_Rule_Id ||
            ' AND      Rslt.'||PrevRsltKeyA||' '||' =
SELMET.'||Where_Obj_Typ||'_Obj_Num '||
            ' AND      Rslt.'||PrevRsltKeyB||' '||' =
SELMET.'||Where_Obj_Typ||'_Obj_Modifier_Num  '||
            ' AND      Rslt.'||PrevRsltKeyA||' '||' = SelTrg.'||SelTrgKeyA ||
            ' AND      Rslt.'||PrevRsltKeyB||' '||' = SelTrg.'||SelTrgKeyB ||
                ' group by 1,2,3,4,5,6,7,8,9 '||
            ';''  ;

Else            /*** All ***/

SET vSQLStmt =
            '''INSERT '|| SumTbl_tempwDB           ||
            ' SELECT  Rslt.Profit_Scenario_Id, '   ||
                    Curs_Rule_Id         ||', '||
            '       Rslt.'||PrevRsltKeyA||', '||
            '       Rslt.'||PrevRsltKeyB||', '||
            '       0,'        ||
            '       0,'||
            '       SelTrg.Drv_Detail_Val, '        ||
                    trg_amort_Ind      ||','||
                    Src_Mult_Rate      ||','||
                    'sum(Rslt.'||PrevRsltAmtCol || ') * '|| SignVal ||
            ' FROM ' || vBC2Source   ||' Rslt, '||
            '     ' || vSelectorTrgTbl||' SELTrg '||
            ' WHERE   SELTrg.Profit_Rule_Id  = '||Curs_Rule_Id ||
            ' AND     Rslt.'||PrevRsltKeyA||' '||' = SelTrg.'||SelTrgKeyA ||
            ' AND     Rslt.'||PrevRsltKeyB||' '||' = SelTrg.'||SelTrgKeyB ||
                ' group by 1,2,3,4,5,6,7,8,9 '||
            ';''  ;

End if;
    Else

IF Crit_or_all_cd = 2  /** Selection Criteria **/
        Then

SET vSQLStmt =
```

```
'''INSERT /*3*/' || SumTbl_tempwDB           ||
' SELECT Rslt.Profit_Scenario_Id, '    ||
    Curs_Rule_Id        ||',    '||
'    T3320.'||SelRelate||'_Obj_Num,'      ||
'    T3320.'||SelRelate||'_Obj_Modifier_Num,' ||
'    0,'       ||
'    0,'||
'    SelTrg.Drv_Detail_Val, '       ||
    trg_amort_Ind    ||','||
    Src_Mult_Rate    ||','||
    'sum(Rslt.'||PrevRsltAmtCol || ') * ' || SignVal ||
' FROM ' || vBC2Source   ||' Rslt, '||
     vDynSQLdb || '.' || 'V3320_ALL_RELATIONS T3320, ' ||
'     ' || vSelectorTrgTbl||' SELTrg ,' ||
'     ' || vSelectorDrvTbl||' SELMET' ||
' WHERE   SELMET.Profit_Rule_Id = '||Curs_Rule_Id ||
' and  SELTRG.Profit_Rule_Id = '||Curs_Rule_Id ||
' And T3320.Object_Type_Rel_Id = ' ||Curr_Rel_Id ||
' And  SELMET.'||Where_Obj_typ||'_Obj_Num =
T3320.'||JoinRelate||'_Obj_Num '||
' And  SELMET.'||Where_Obj_Typ||'_Obj_Modifier_Num =
T3320.'||JoinRelate||'_Obj_Modifier_Num '||
' And  T3320.'||SelRelate||'_Obj_Num = SelTrg.'||SelTrgKeyA ||
' And  T3320.'||SelRelate||'_Obj_Modifier_Num =
SelTrg.'||SelTrgKeyB ||
' And  Rslt.'||PrevRsltKeyA ||' = T3320.'||JoinRelate||'_Obj_Num  '||
' And  Rslt.'||PrevRsltKeyB|| ' =
T3320.'||JoinRelate||'_Obj_Modifier_Num '||
     Asst_Rslt_Obj_typ ||
' And Rslt.Profit_scenario_id in ' ||
' (select distinct profit_scenario_id from
$VIEWDB.v3266_profit_run_scenario_rule '||
'  Where profit_rule_id = '||curs_rule_id||' )'||
' group by 1,2,3,4,5,6,7,8,9 ' ||
';''  ;
IF vSQLStmt is null
    then set VSQLStmt = '''/**ERROR3:  This statement was nulled
out.**/''';
    end if;

Else   /** all **/

SET vSQLStmt =
'''INSERT /*4*/' || SumTbl_tempwDB           ||
' SELECT Rslt.Profit_Scenario_Id, '    ||
```

```
            Curs_Rule_Id         ||','||
    '       T3320.'||SelRelate||'_Obj_Num,'      ||
    '       T3320.'||SelRelate||'_Obj_Modifier_Num,' ||
    '       0,'     ||
    '       0,' ||
    '       SelTrg.Drv_Detail_Val, '          ||
            trg_amort_Ind        ||','||
            Src_Mult_Rate        ||','||
            'sum(Rslt.'||PrevRsltAmtCol  || ') * ' || SignVal ||
    ' FROM ' || vBC2Source    ||' Rslt, ' ||
    '        ' || vSelectorTrgTbl||' SELTrg,' ||
            vDynSQLdb || '.' || 'V3320_ALL_RELATIONS T3320 ' ||
    ' WHERE Rslt.'||PrevRsltKeyA ||' = T3320.'||JoinRelate||'_Obj_Num '
||
    '   And Rslt.'||PrevRsltKeyB|| ' =
T3320.'||JoinRelate||'_Obj_Modifier_Num '||
    '   and  SELTRG.Profit_Rule_Id = '||Curs_Rule_Id ||
        Asst_Rslt_Obj_typ ||
    '   And  T3320.'||SelRelate||'_Obj_Num = SelTrg.'||SelTrgKeyA ||
    '   And  T3320.'||SelRelate||'_Obj_Modifier_Num =
SelTrg.'||SelTrgKeyB ||
    '   And T3320.Object_Type_Rel_Id = ' ||Curr_Rel_Id ||
    '   And Rslt.Profit_scenario_id  in ' ||
    ' (select distinct profit_scenario_id from
$VIEWDB.v3266_profit_run_scenario_rule '||
    '   Where profit_rule_id = '||curs_rule_id||' )'||
    ' group by 1,2,3,4,5,6,7,8,9 ' ||
    ';''' ;
    IF vSQLStmt is null
        then set VSQLStmt = '''/**ERROR4:  This statement was nulled
out.**/''';
        end if;

End if;

End if;
End if;

SET vNextSQLKey = vNextSQLKey + 1;
    CALL DBC.SysExecSQL
        ('INS $VIEWDB.V3340_CALC_ENGINE_SQL '      ||
        ' sel ' || :vNextSQLKey || ',  ' ||
            :vPCType || ',  ' ||
    '   2, '  ||
```

```
'    435, ' ||
'     30, ' ||
     :vSQLStmt|| ', ' ||
'   null,' ||
'   null,' ||
'   null,' ||
'     1, ' ||
'   null,' ||
'   null,' ||
'   null,' ||
'   null;');
```

/ Collect Stats on Final table prior to update /
SET vSQLStmt =
'''COLLECT STATISTICS ON ' || SumTbl_wDB ||
' INDEX( '||
'          Profit_Rule_Id, '              ||
'          Profit_Scenario_Id, '          ||
'          Trg_Associate_Obj_Num, '       ||
'          Trg_Associate_Obj_Modifier_Num , '||
'          Relates_Obj_Num, '             ||
'          Relates_Obj_Modifier_Num      ' ||
');''';

SET vNextSQLKey = vNextSQLKey + 1;
CALL DBC.SysExecSQL
   ('INS $VIEWDB.V3340_CALC_ENGINE_SQL '   ||
   ' sel ' || :vNextSQLKey || ', ' ||
       :vPCType || ', ' ||
'      2, ' ||
'    435, ' ||
'     30, ' ||
     :vSQLStmt|| ', ' ||
'   null,' ||
'   null,' ||
'   null,' ||
'     1, ' ||
'   null,' ||
'   null,' ||
'   null,' ||
'   null;');

/ update matching rows summing additional results (signed) */

```
    SET vSQLStmt =
    '''UPDATE ' || SumTbl_wDB           ||' t3168 '||
    ' SET Trg_Obj_Rule_Amt = t3168.Trg_Obj_Rule_Amt + '||
              SumTbl_tempwDB||'.Trg_Obj_Rule_Amt' ||
    ' WHERE  T3168.Profit_Rule_Id      =
'||SumTbl_tempwDB||'.'||'Profit_Rule_Id'||
    '  AND  T3168.Profit_Scenario_Id   =
'||SumTbl_tempwDB||'.'||'Profit_Scenario_Id '||
    '  AND  T3168.Trg_Associate_Obj_Num = '||
              SumTbl_tempwDB||'.'||'Trg_Associate_Obj_Num'||
    '  AND  T3168.Trg_Associate_Obj_Modifier_Num = '||
              SumTbl_tempwDB||'.'||'Trg_Associate_Obj_Modifier_Num'||
    '  AND  T3168.relates_Obj_Num = '||
              SumTbl_TempwDB||'.'||'relates_Obj_Num'||
    '  AND  T3168.relates_Obj_Modifier_Num = '||
              SumTbl_TempwDB||'.'||'relates_Obj_Modifier_Num'||

';''' ;

SET vNextSQLKey = vNextSQLKey + 1;
CALL DBC.SysExecSQL
   ('INS $VIEWDB.V3340_CALC_ENGINE_SQL '    ||
    ' sel ' || :vNextSQLKey || ', ' ||
        :vPCType || ', ' ||
    '   2, '  ||
    '   435, ' ||
    '   30, ' ||
        :vSQLStmt|| ', ' ||
    '   null,' ||
    '   null,' ||
    '   null,' ||
    '   1, ' ||
    '   null,' ||
    '   null,' ||
    '   null,' ||
    '   null;');

SET vSQLStmt =
    '''INSERT ' || SumTbl_wDB           ||
    ' SELECT * '||
    ' FROM ' || SumTbl_tempwDB   ||
    ' WHERE (Profit_Scenario_Id, '||
    '        Profit_Rule_Id,   '||
    '        Trg_Associate_Obj_Num,' ||
```

```
'       Trg_Associate_Obj_Modifier_Num )' ||
'       NOT IN (select ' ||
'           Profit_Scenario_Id, '      ||
'           Profit_Rule_Id,    '||
'           Trg_Associate_Obj_Num,'    ||
'           Trg_Associate_Obj_Modifier_Num' ||
'           FROM ' || SumTbl_wDB || ')' ||
';"' ;

SET vNextSQLKey = vNextSQLKey + 1;
CALL DBC.SysExecSQL
    ('INS $VIEWDB.V3340_CALC_ENGINE_SQL '   ||
    ' sel ' || :vNextSQLKey || ', ' ||
        :vPCType || ', ' ||
    '   2, '  ||
    '   435, ' ||
    '   30, ' ||
        :vSQLStmt|| ', ' ||
    '   null,' ||
    '   null,' ||
    '   null,' ||
    '   1, ' ||
    '   null,' ||
    '   null,' ||
    '   null,' ||
    '   null;');

End if;

If SignVal = 1.00
Then
  Set ABS_Flag = 'Y';
End if;

END FOR;

/**** signage processing ***/
If ABS_flag = 'N'
then

SET vSQLStmt =
```

```
            '"UPDATE ' || SumTbl_wDB        ||' t3168 '||
            ' SET Trg_Obj_Rule_Amt = t3168.Trg_Obj_Rule_Amt * -1.00 ' ||
            ' WHERE  T3168.Profit_Rule_Id      = '||Working_Rule_id||
              ';"' ;

SET vNextSQLKey = vNextSQLKey + 1;
CALL DBC.SysExecSQL
        ('INS $VIEWDB.V3340_CALC_ENGINE_SQL '    ||
            ' sel ' || :vNextSQLKey || ', ' ||
            :vPCType || ', ' ||
            '  2, ' ||
            '  435, ' ||
            '  30, ' ||
            :vSQLStmt|| ', ' ||
            '  null,' ||
            '  null,' ||
            '  null,' ||
            '  1, ' ||
            '  null,' ||
            '  null,' ||
            '  null,' ||
            '  null;');
End if;

SET vSQLStmt =
        '"INSERT ' || SumTbl_Tots       ||
        ' SELECT DrvTbl.Profit_Scenario_Id, '    ||
        '     DrvTbl.Profit_Rule_Id , '      ||
        '     Relates_Obj_Num ,'         ||
        '     Relates_Obj_Modifier_Num ,' ||
        '     sum(Trg_Obj_Rule_Amt) '    ||
        ' FROM ' || SumTbl_wDB   ||' DrvTbl '||
        ' WHERE DrvTbl.Profit_Rule_Id = '||Working_Rule_Id ||
        ' group by 1,2,3,4 ' ||
          ';"' ;

SET vNextSQLKey = vNextSQLKey + 1;
CALL DBC.SysExecSQL
        ('INS $VIEWDB.V3340_CALC_ENGINE_SQL '    ||
            ' sel ' || :vNextSQLKey || ', '||
            :vPCType|| ', ' ||
            '  2, ' ||
```

```
    '   435, ' ||
    '    20, ' ||
        :vSQLStmt|| ', ' ||
    '   null,' ||
    '   null,' ||
    '   null,' ||
    '    1,  ' ||
    '   null,' ||
    '   null,' ||
    '   null,' ||
    '   null;');
```

Else

/*********************************************************************/
/*********************************************************************/
/*********************************************************************/
/***  SRC Previous Metric Sums
*********************************************/
/*********************************************************************/
/*********************************************************************/
/*********************************************************************/

```
SET SumTbl_wDB   = vDynSQLdb || '.W3168_Metric_Sum_Src';
SET SumTbl_Tots = vDynSQLdb || '.W3168_Metric_Sum_Src_Tots';
SET SumTbl_woDB = 'W3168_Metric_Sum_Src';
```

/**********************************************************************
If the Prev Sum Table already exists, then skip Create Table, else Create
**********************************************************************/
```
SEL count(*)
INTO :vRowCount
FROM $VIEWDB.V3346_CALC_ENGINE_TABLE_REF
WHERE Calc_Engine_Table_Name = :SumTbl_woDB;

IF vRowCount = 0
THEN

SET vSQLStmt =
    '''CREATE SET TABLE ' || SumTbl_wDB        ||
    ' (Profit_Scenario_Id INTEGER, '           ||
    '  Profit_Rule_Id INTEGER, '               ||
```

```
  ' Trg_Associate_Obj_Num '        || vDTAssoc || ','||
  ' Trg_Associate_Obj_Modifier_Num '|| vDTAssocMod || ','||
  ' Relates_Obj_Num '|| vDTAssoc || ','         ||
  ' Relates_Obj_Modifier_Num '|| vDTAssocMod || ','||
  ' Trg_Amortization_Ind_Cd SMALLINT,'          ||
  ' Src_Multiplier_Rate DECIMAL(15,12), '    ||
  ' Trg_Obj_Rule_Amt  DECIMAL(18,4) ) '          ||
  ' PRIMARY INDEX ( Profit_Rule_Id, '            ||
  '            Profit_Scenario_Id ,   '       ||
  '            Trg_Associate_Obj_Num, '          ||
  '            Trg_Associate_Obj_Modifier_Num, ' ||
  '            Relates_Obj_Num, '       ||
  '            Relates_Obj_Modifier_Num );''';

SET vNextSQLKey = vNextSQLKey + 1;
CALL DBC.SysExecSQL
   ('INS $VIEWDB.V3340_CALC_ENGINE_SQL '   ||
   ' sel '|| :vNextSQLKey || ', '||
      :vPCType|| ', '   ||
   '  2, ' ||
   '  435, ' ||
   '  20, ' ||
      :vSQLStmt|| ', ' ||
   '  null,' ||
   '  null,' ||
   '  null,' ||
   '  1, ' ||
   '  null,' ||
   '  null,' ||
   '  null,' ||
   '  null;');

INSERT $VIEWDB.V3346_CALC_ENGINE_TABLE_REF
   SELECT :vNextSQLKey,
       :vPCType,
       :SumTbl_woDB;

End if;

Set ABS_Flag = 'X';
Set Working_Rule_Id = 0;

FOR RunRow as IOCursor CURSOR FOR
SELECT t3442.Profit_Rule_Id,
     t3442.Src_Metric_Cd,
```

```
    T3356.Src_Linkage_XChrg_Rel_Id,
    T3356.Src_Object_type_cd,
    t3356.trg_object_type_cd,
    t3356.trg_object_type_categ_cd,
    t3356.Src_Multiplier_Rate,
    t3356.Trg_Amortization_Ind_Cd,
    zeroifnull(T3356.Src_Linkage_Object_Type_Rel_Id) as
Src_Linkage_Object_Type_Rel_Id,
    T3334.Sign_Adjustment_Val,
    m0035.object_type_categ_cd
  FROM  $VIEWDB.V3347_CALC_ENGINE_WIP_SUBSET t3347,
        $VIEWDB.V3356_PROFIT_RULEX                T3356,
        $VIEWDB.V3442_PROFIT_RULE_Src_METRIC      t3442,
        $VIEWDB.V3334_RULE_CHAIN_METRIC_USAGE          T3334,
        $VIEWDB.V0035_Analytic_Soln_Obj_type      M0035
  WHERE  T3347.Profit_Rule_Id = T3356.Profit_Rule_Id
   AND  T3356.Profit_Rule_Id = T3442.Profit_Rule_Id
   AND  T3442.Src_Metric_Cd = T3334.Metric_Cd
   AND  t3356.src_object_type_cd = m0035.object_type_cd
   AND  m0035.Analytic_Solution_cd = 1
ORDER BY 1,2
DO
  Set Curr_Categ_Cd = runrow.trg_object_type_categ_cd;
  Set Prev_Categ_Cd = runrow.object_type_categ_cd;
  Set Trg_Amort_Ind = runrow.Trg_Amortization_Ind_Cd;
  Set Src_Mult_Rate = runrow.Src_Multiplier_Rate;
  Set Trg_Obj_type_cd = runrow.trg_object_type_cd;
  Set Src_Obj_type_cd = runrow.Src_object_type_cd;

If runrow.Src_Linkage_Object_Type_Rel_Id <> -1
  Then
    Set Curr_Rel_Id = runrow.Src_Linkage_Object_Type_Rel_Id;

Select
    Relates_Object_type_cd ,
    Related_Object_type_cd
  Into :Src_Relates,
    :Src_Related
  From
    $VIEWDB.V0032_Object_Type_Relation
  Where Object_type_Rel_Id = :Curr_Rel_Id;

If RunRow.Trg_Object_type_cd = Src_Relates
  Then
    Set SelRelate = 'Relates';
```

```
      Set JoinRelate = 'Related';
    Else
      Set SelRelate  = 'Related';
      Set JoinRelate = 'Relates';
    End if;

Else
    Set Curr_Rel_Id = runrow.Src_Linkage_XChrg_Rel_Id;
  End if;

Set Prev_Metric_Cd = RunRow.Src_Metric_Cd;
CASE Prev_Metric_Cd
   WHEN '11' THEN SET Prev_Metric_Txt = 'AB' ;
   WHEN '10' THEN SET Prev_Metric_Txt = 'AC' ;
   WHEN '3' THEN SET Prev_Metric_Txt = 'DE' ;
   WHEN '2' THEN SET Prev_Metric_Txt = 'OR' ;
   WHEN '5' THEN SET Prev_Metric_Txt = 'RP' ;
   WHEN '4' THEN SET Prev_Metric_Txt = 'IE' ;
   WHEN '21' THEN SET Prev_Metric_Txt = 'EAC';
   WHEN '31' Then SET Prev_Metric_Txt = 'NOE';
   WHEN '1' Then SET Prev_Metric_Txt = 'NIR';
END CASE;

If Curr_Categ_Cd = 1
Then
    Set vSelectorTrgTbl = vViewdb|| '.V3350_' || PCCode || '_BASE_OBJ_TRG ';
    Set SelTrgKeyA = 'Base_Obj_Num' ;
    Set SelTrgKeyB = 'Base_Obj_Modifier_Num';
  Else
    Set vSelectorTrgTbl = vViewdb|| '.V3351_' || PCCode || '_ASSOCIATE_OBJ_TRG ';
    Set SelTrgKeyA = 'Associate_Obj_Num' ;
    Set SelTrgKeyB = 'Associate_Obj_Modifier_Num';
  End if;

If Prev_Categ_Cd = 1   /** BASE **/
Then
   SET vBC2Source  = vViewdb   || '.V3363_' ||
           Prev_Metric_Txt   || '_BASE_OBJ_RESULT';
   SET PrevRsltKeyA = 'Base_Obj_Num' ;
   SET PrevRsltKeyB = 'Base_Obj_Modifier_Num';
   If Prev_Metric_Txt <> 'NIR'
```

```
Then
  SET PrevRsltAmtCol = 'Base_Obj_Metric_Amt';
Else
  SET PrevRsltAmtCol = 'Base_Obj_NIR_Amt';
End if;
Set Asst_Rslt_Obj_typ = ' ';

Else      /** ASSOCIATE **/
  SET vBC2Source  = vViewdb  || '.V3373_' ||
           Prev_Metric_Txt  || '_ASSOCIATE_OBJ_RESULT';
  SET PrevRsltKeyA = 'Associate_Obj_Num' ;
  SET PrevRsltKeyB = 'Associate_Obj_Modifier_Num';
  If Prev_Metric_Txt <> 'NIR'
  Then
    SET PrevRsltAmtCol = 'Associate_Obj_Metric_Amt';
  Else
    SET PrevRsltAmtCol = 'Assoc_Obj_NIR_Amt';
  End if;
  Set Asst_Rslt_Obj_typ = ' And Object_Type_Cd = '||Src_Obj_type_cd ;

End if;

Set Curs_Rule_Id = runrow.Profit_Rule_Id;
Set SignVal = runrow.Sign_Adjustment_Val;

If Curs_Rule_Id <> Working_Rule_Id
Then

/** signage processing */
 If ABS_flag = 'N'
 then

SET vSQLStmt =
      '''UPDATE ' || SumTbl_wDB         ||' t3168 '||
      ' SET Trg_Obj_Rule_Amt = t3168.Trg_Obj_Rule_Amt * -1.00 ' ||
      ' WHERE  T3168.Profit_Rule_Id     = '||Working_Rule_id||
        ';''' ;

SET vNextSQLKey = vNextSQLKey + 1;
  CALL DBC.SysExecSQL
    ('INS $VIEWDB.V3340_CALC_ENGINE_SQL '    ||
     ' sel ' || :vNextSQLKey || ', ' ||
     :vPCType || ', ' ||
       '    2, ' ||
       '  435, ' ||
```

```
         '    30, '   ||
              :vSQLStmt|| ', '  ||
         '    null,'  ||
         '    null,'  ||
         '    null,'  ||
         '    1,  '   ||
         '    null,'  ||
         '    null,'  ||
         '    null,'  ||
         '    null;');

Else
    Set ABS_flag = 'N';
End if;

SET vSQLStmt =
    '''INSERT ' || SumTbl_wDB             ||
    ' SELECT Profit_Scenario_Id, '    ||
            Curs_Rule_Id    ||', '||
    '      '||PrevRsltKeyA||','  ||
    '      '||PrevRsltKeyB||','  ||
            ' 0 , 0 ,' ||
            trg_amort_Ind     ||','||
            Src_Mult_Rate     ||','||
            'sum('||PrevRsltAmtCol  || ') * ' || SignVal ||
    ' FROM ' || vBC2Source   ||' Rslt ' ||
    ' WHERE  Profit_Scenario_Id in '||
    ' (select distinct profit_scenario_id from
$VIEWDB.v3266_profit_run_scenario_rule '||
    ' Where profit_rule_id = '||curs_rule_id||' )'||
            Asst_Rslt_Obj_typ ||
    ' group by 1,2,3,4,5,6,7,8 ' ||
    ''','''  ;

SET vNextSQLKey = vNextSQLKey + 1;
    CALL DBC.SysExecSQL
        ('INS $VIEWDB.V3340_CALC_ENGINE_SQL '   ||
        ' sel ' || :vNextSQLKey || ', '  ||
            :vPCType || ', '  ||
         '    2, '   ||
         '    435, ' ||
         '    30, '  ||
            :vSQLStmt|| ', '  ||
         '    null,' ||
```

```
          '    null,'  ||
          '    null,'  ||
          '    1,   '  ||
          '    null,'  ||
          '    null,'  ||
          '    null,'  ||
          '    null;');

Set Working_Rule_Id = Curs_Rule_Id;

Else

SET SumTbl_tempwoDB = 'W3168_Metric_Sum_Src_Temp';

SET SumTbl_tempwDB = vDynSQLdb ||
'.W3168_Metric_Sum_Src_Temp';

/**********************************************************************
 If the Prev Sum TEMP Table already exists, then skip Create Table, else
Create
 **********************************************************************/
    SEL count(*)
    INTO :vRowCount
    FROM $VIEWDB.V3346_CALC_ENGINE_TABLE_REF
    WHERE Calc_Engine_Table_Name = :SumTbl_tempwoDB;

IF vRowCount = 0
    THEN

SET vSQLStmt =
        '''CREATE SET TABLE ' || SumTbl_tempwDB             ||
        ' (Profit_Scenario_Id INTEGER, '                    ||
        ' Profit_Rule_Id INTEGER, '                         ||
        ' Trg_Associate_Obj_Num ' || vDTAssoc || ','        ||
        ' Trg_Associate_Obj_Modifier_Num ' || vDTAssocMod || ','||
        ' Relates_Obj_Num ' || vDTAssoc || ','              ||
        ' Relates_Obj_Modifier_Num ' || vDTAssocMod || ','  ||
        ' Trg_Amortization_Ind_Cd SMALLINT,'                ||
        ' Src_Multiplier_Rate DECIMAL(15,12), '             ||
        ' Trg_Obj_Rule_Amt  DECIMAL(18,4)) '                ||
        ' PRIMARY INDEX ( Profit_Rule_Id, '                 ||
        '                 Profit_Scenario_Id , '            ||
        '                 Trg_Associate_Obj_Num, '          ||
        '                 Trg_Associate_Obj_Modifier_Num, ' ||
        '                 Relates_Obj_Num, '                ||
```

```
                    '     Relates_Obj_Modifier_Num );''';

INSERT $VIEWDB.V3346_CALC_ENGINE_TABLE_REF
SELECT :vNextSQLKey,
  :vPCType,
  :SumTbl_tempwoDB;

Else

SET vSQLStmt =
 '''Delete ' || SumTbl_tempwDB || ';''' ;

End if;

SET vNextSQLKey = vNextSQLKey + 1;
CALL DBC.SysExecSQL
  ('INS $VIEWDB.V3340_CALC_ENGINE_SQL '     ||
   ' sel ' || :vNextSQLKey || ', ' ||
      :vPCType|| ', ' ||
   '    2, ' ||
   '    435, ' ||
   '    20, ' ||
      :vSQLStmt|| ', ' ||
   '    null,' ||
   '    null,' ||
   '    null,' ||
   '    1, ' ||
   '    null,' ||
   '    null,' ||
   '    null,' ||
   '    null;');

SET vSQLStmt =
'''INSERT ' || SumTbl_tempwDB            ||
' SELECT Profit_Scenario_Id, '     ||
     Curs_Rule_Id    ||', '||
'     '||PrevRsltKeyA||','||
'     '||PrevRsltKeyB||','||
     '0 , 0 ,'||
     trg_amort_Ind        ||','||
     Src_Mult_Rate       ||','||
     'sum('||PrevRsltAmtCol || ') * ' || SignVal ||
' FROM ' || vBC2Source    ||' Rslt ' ||
' WHERE  Profit_Scenario_Id in '||
```

```
            ' (select distinct profit_scenario_id from
$VIEWDB.v3266_profit_run_scenario_rule '||
        ' Where profit_rule_id = '||curs_rule_id||' )'||
            Asst_Rslt_Obj_typ ||
        ' group by 1,2,3,4,5,6,7,8 ' ||
        ';''' ;

SET vNextSQLKey = vNextSQLKey + 1;
    CALL DBC.SysExecSQL
        ('INS $VIEWDB.V3340_CALC_ENGINE_SQL '     ||
        ' sel ' || :vNextSQLKey || ', ' ||
            :vPCType || ', ' ||
        '    2, '  ||
        '    435, ' ||
        '    30, ' ||
            :vSQLStmt|| ', ' ||
        '    null,' ||
        '    null,' ||
        '    null,' ||
        '    1, '  ||
        '    null,' ||
        '    null,' ||
        '    null,' ||
        '    null;');

/** update matching rows summing additional results (signed) ***/
    SET vSQLStmt =
        '''UPDATE ' || SumTbl_wDB        ||' t3168 '||
        ' SET Trg_Obj_Rule_Amt = t3168.Trg_Obj_Rule_Amt + '||
                    SumTbl_tempwDB||'.Trg_Obj_Rule_Amt' ||
        ' WHERE  T3168.Profit_Rule_Id    =
'||SumTbl_tempwDB||'.'||'Profit_Rule_Id'||
        '  AND  T3168.Profit_Scenario_Id   =
'||SumTbl_tempwDB||'.'||'Profit_Scenario_Id '||
        '  AND  T3168.Trg_Associate_Obj_Num = '||
                    SumTbl_tempwDB||'.'||'Trg_Associate_Obj_Num'||
        '  AND  T3168.Trg_Associate_Obj_Modifier_Num = '||

SumTbl_tempwDB||'.'||'Trg_Associate_Obj_Modifier_Num'||
        '  AND  T3168.Relates_Obj_Num = '||
                    SumTbl_tempwDB||'.'||'Relates_Obj_Num'||
```

```
'    AND  T3168.Relates_Obj_Modifier_Num = '||
                SumTbl_tempwDB||'.'||'Relates_Obj_Modifier_Num'||
    ';"' ;

SET vNextSQLKey = vNextSQLKey + 1;
CALL DBC.SysExecSQL
  ('INS $VIEWDB.V3340_CALC_ENGINE_SQL '     ||
   ' sel '|| :vNextSQLKey || ', ' ||
       :vPCType || ', ' ||
   '   2, ' ||
   '   435, ' ||
   '   30, ' ||
       :vSQLStmt|| ', ' ||
   '   null,' ||
   '   null,' ||
   '   null,' ||
   '   1, ' ||
   '   null,' ||
   '   null,' ||
   '   null,' ||
   '   null;');

SET vSQLStmt =
  '''INSERT ' || SumTbl_wDB            ||
  ' SELECT * '||
  ' FROM ' || SumTbl_tempwDB   ||
  ' WHERE (Profit_Scenario_Id, '||
  '        Profit_Rule_Id,     '||
  '        Trg_Associate_Obj_Num,'||
  '        Trg_Associate_Obj_Modifier_Num )'||
  '        NOT IN (select '||
  '           Profit_Scenario_Id, '    ||
  '           Profit_Rule_Id,    '||
  '           Trg_Associate_Obj_Num,'    ||
  '           Trg_Associate_Obj_Modifier_Num'||
  '        FROM ' || SumTbl_wDB || ')'||
  ';"' ;

SET vNextSQLKey = vNextSQLKey + 1;
CALL DBC.SysExecSQL
  ('INS $VIEWDB.V3340_CALC_ENGINE_SQL '     ||
   ' sel '|| :vNextSQLKey || ', ' ||
       :vPCType || ', ' ||
   '   2, ' ||
```

```
       '    435, '     ||
       '    30,  '     ||
          :vSQLStmt|| ', '   ||
       '    null,'     ||
       '    null,'     ||
       '    null,'     ||
       '    1,   '     ||
       '    null,'     ||
       '    null,'     ||
       '    null,'     ||
       '    null;');

End if;

If SignVal = 1.00
Then
  Set ABS_Flag = 'Y';
End if;

END FOR;

/**** signage processing ***/
If ABS_flag = 'N'
then

SET vSQLStmt =
      '''UPDATE ' || SumTbl_wDB           ||' t3168 '||
      ' SET Trg_Obj_Rule_Amt = t3168.Trg_Obj_Rule_Amt * -1.00 ' ||
      ' WHERE  T3168.Profit_Rule_Id     = '||Working_Rule_id||
         '.''' ;

SET vNextSQLKey = vNextSQLKey + 1;
CALL DBC.SysExecSQL
    ('INS $VIEWDB.V3340_CALC_ENGINE_SQL '     ||
     ' sel ' || :vNextSQLKey || ', '   ||
     :vPCType || ', '  ||
       '    2,  '      ||
       '    435, '     ||
       '    30,  '     ||
         :vSQLStmt|| ', '   ||
       '    null,'     ||
       '    null,'     ||
       '    null,'     ||
       '    1,   '     ||
```

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory computer-readable storage medium and processed by a processor to perform the method, comprising:
   receiving, by the processor, Structured Query Language (SQL) statements;
   identifying, by the processor, a first metric calculation and a second metric calculation included and used in the SQL statements, wherein both the first metric calculation and the second metric calculation are processed as part of the SQL statements and summed as a source input for a target rule that is also processed and included within the SQL statements, the source input is a sum of previous rules; and
   processing, by the processor, the first metric calculation and the second metric calculation against a database and using results from both the first metric calculation and the second metric calculation as the source that is fed to the target rule within the SQL statements, and wherein the target rule is processed with the results.

2. The method of claim 1, wherein receiving further includes interacting with a user via a graphical user interface to receive the SQL statements.

3. The method of claim 1, wherein identifying further includes parsing the SQL statements to identify a first rule that defines the first metric calculation and to identify a second rule that defines the second metric calculation.

4. The method of claim 3, wherein identifying further includes identifying the second metric calculation as a different metric from that which is associated with the first metric calculation.

5. The method of claim 1, wherein identifying further includes recognizing two different rules that define the first metric calculation within the SQL statements.

6. The method of claim 1, wherein processing further includes summing the first metric calculation and the second metric calculation to obtain the results that are provided as the source to the target rule when processing the SQL statements.

7. A method implemented in a non-transitory computer-readable storage medium and processed by a processor to perform the method, comprising:
   dynamically parsing, by the processor, Structured Query Language (SQL) statements to obtain from the SQL statements a first metric calculation and a second metric calculation both the first metric calculation and the second metric calculation included within the SQL statements; processing, by the processor, both the first metric calculation and the second metric calculation against a database, as part of the processing associated with executing the SQL statements, and then summing first results from the first metric calculation with second results from the second metric calculation to produce combined results, and wherein the first metric calculation is defined by chained rules; and
   using, by the processor, the combined results as input to other portions of the SQL statements while processing the other portions against the database, wherein the input is a sum of previous rules.

8. The method of claim 7, wherein dynamically parsing further includes recognizing the first metric calculation as a first rule that is to be evaluated when the first metric calculation is processed.

9. The method of claim 8, wherein dynamically parsing further includes recognizing the second metric calculation as a second rule that is to be evaluated when the second metric calculation is processed.

10. The method of claim 8, wherein processing further includes processing a second rule chain representing another set of rules when calculating the second metric calculation.

11. The method of claim 7, wherein processing further includes producing the combined results as a source to the other portions of the SQL statements.

12. The method of claim 7, wherein processing further includes producing the combined results as a driver to the other portions of the SQL statements.

13. The method of claim 7, wherein processing further includes processing a first rule chain representing a set of rules when calculating the first metric calculation.

14. A computer-implemented system that executes on one or more processors, the system comprising:
   a processor configured with a Structured Query Language (SQL) preprocessor implemented in a non-transitory computer-readable storage medium and executed by the processor of a network; and
   the processor configured for accessing a data store implemented in a non-transitory computer-readable storage medium and accessible to the SQL preprocessor;
   wherein the SQL preprocessor iterates SQL statements while processing the SQL statements to automatically and dynamically identify and process multiple metric calculations that are defined and included within the SQL statements against the database to produce combined results that feed other portions of the SQL statements while those other portions of the SQL statements are processed, the multiple metric calculations defined by chained rules, and the combined results that feed other portions of the SQL statements is a sum of previous rules.

15. The system of claim 14, wherein the SQL preprocessor iterates the SQL statements to process multiple sets of rules for each of the metric calculations.

16. The system of claim 14, wherein the SQL preprocessor feeds the combined results as a source input to a rule that represents the other portions of the SQL statements.

17. The system of claim 14, wherein the SQL preprocessor feeds the combined results as a driver to the remaining portions of the SQL statements.

18. The system of claim 14, wherein the SQL preprocessor interacts with a user via a graphical user interface to interactively acquire the SQL statements.

19. The system of claim 14, wherein data store is a data warehouse that includes a collection of databases logically organized and accessible as a single unit.

* * * * *